(12) United States Patent
Gettings et al.

(10) Patent No.: US 8,910,298 B2
(45) Date of Patent: Dec. 9, 2014

(54) ENVIRONMENTAL MONITORING DEVICE

(71) Applicant: Leeo, Inc., Palo Alto, CA (US)

(72) Inventors: Adam M. Gettings, Red Wing, MN (US); Andrew G. Stevens, Palo Alto, CA (US); Bjorn H. Hovland, Woodside, CA (US)

(73) Assignee: Leeo, Inc., Palo Alto, CA (US)

(*) Notice: Subject to any disclaimer, the term of this patent is extended or adjusted under 35 U.S.C. 154(b) by 0 days.

(21) Appl. No.: 14/263,899

(22) Filed: Apr. 28, 2014

(65) Prior Publication Data

US 2014/0283144 A1 Sep. 18, 2014

Related U.S. Application Data

(63) Continuation of application No. PCT/US2014/025742, filed on Mar. 13, 2014.

(60) Provisional application No. 61/802,310, filed on Mar. 15, 2013.

(51) Int. Cl.
| | | |
|---|---|---|
| *G06F 11/30* | (2006.01) | |
| *G08B 23/00* | (2006.01) | |
| *G08C 19/00* | (2006.01) | |
| *H04L 9/08* | (2006.01) | |
| *G05B 15/02* | (2006.01) | |
| *G06Q 10/06* | (2012.01) | |
| *H04L 29/06* | (2006.01) | |

(52) U.S. Cl.
CPC ............ *G08B 23/00* (2013.01); *G08C 19/00* (2013.01); *H04L 9/0861* (2013.01); *G05B 15/02* (2013.01); *G06Q 10/0635* (2013.01); *H04L 63/10* (2013.01); *H04L 2209/72* (2013.01)
USPC ................................................ 726/26; 702/1

(58) Field of Classification Search
CPC ...... G06F 21/10; G06F 11/30; G06F 11/3058; G06F 11/3062; G06F 11/3065; G06F 11/3089; H04L 43/0817
USPC ........................................ 726/30, 26, 4; 702/1
See application file for complete search history.

(56) References Cited

U.S. PATENT DOCUMENTS 5,159,315 A    10/1992    Schultz et al.
6,023,223 A *    2/2000    Baxter, Jr. ............... 340/531

(Continued)

FOREIGN PATENT DOCUMENTS

GB         2454731        5/2009

OTHER PUBLICATIONS

Hayashi et al., "A Network-Centric Approach to Sensor-data and Service Integration", Sep. 13-18, 2011, SICE Annual Conference, pp. 2037-2042.*

(Continued)

*Primary Examiner* — Matthew Smithers
(74) *Attorney, Agent, or Firm* — Levine Bagade Han LLP

(57) ABSTRACT

An environmental monitoring device that monitors the operation of a legacy electronic device is described. In particular, a sensor in the environmental monitoring device provides sensor data that represents an environmental condition in an external environment that includes the environmental monitoring device. This environmental condition is associated with the operation of the legacy electronic device in the external environment. The environmental monitoring device analyzes the sensor data and provides feedback about the operation of the legacy electronic device based on the analyzed sensor data. Moreover, the sensor provides the sensor data without or excluding communication and/or electrical coupling between the environmental monitoring device and the legacy electronic device. In this way, the environmental monitoring device facilitates monitoring, analysis and feedback of the sensor data without directly interacting with the legacy electronic device.

20 Claims, 22 Drawing Sheets

(56) References Cited

U.S. PATENT DOCUMENTS

| | | |
|---|---|---|
| 7,515,041 B2 | 4/2009 | Eisold et al. |
| 7,994,928 B2 | 8/2011 | Richmond |
| 8,451,132 B1 | 5/2013 | Van Vleet |
| 8,610,587 B2 | 12/2013 | Tropper |
| 2009/0096620 A1 | 4/2009 | Kuo |
| 2009/0141898 A1* | 6/2009 | Huang .................. 380/270 |
| 2012/0023555 A1* | 1/2012 | Putterman .................. 726/4 |

OTHER PUBLICATIONS

Miyaho et al., "Sensor Network Management for Healthcare Applications", 2010, IEEE Computer Society, pp. 14-20.*

Huang et al., "Pervasive, Secure Access to a Hierarchical Sensor-Based Healthcare Monitoring Architecture in Wireless Heterogeneous Networks", May 4, 2009, IEEE Journal on Selected Areas in Communications, vol. 27, No. 4, pp. 400-411.*

* cited by examiner

ENVIRONMENTAL MONITORING DEVICE

CROSS REFERENCE TO RELATED APPLICATION

This application is a continuation of PCT Application No. PCT/US14/25742, filed 13 Mar. 2014, which claims priority under 35 U.S.C. §119(e) to U.S. Provisional Application Ser. No. 61/802,310, filed on Mar. 15, 2013, both of which are herein incorporated by reference in their entireties.

BACKGROUND

1. Field

The described embodiments relate generally to environmental monitoring devices, and more specifically to techniques for providing feedback on the operation of electronic devices in an environment and generating a historical record.

2. Related Art

Trends in connectivity and in portable electronic devices are resulting in dramatic changes in people's lives. For example, the Internet now allows individuals access to vast amounts of information, as well as the ability to identify and interact with individuals, organizations and companies around the world. This has resulted in a significant increase in online financial transactions (which are sometimes referred to as 'ecommerce'). Similarly, the increasingly powerful computing and communication capabilities of portable electronic device (such as smartphones), as well as a large and growing set of applications, are accelerating these changes, providing individuals access to information at arbitrary locations and the ability to leverage this information to perform a wide variety of tasks.

Recently, it has been proposed these capabilities be included in other electronic devices that are located throughout our environments, including those that people interact with infrequently. In the so-called 'Internet of things,' it has been proposed that future versions of these so-called 'background' electronic devices be outfitted with more powerful computing capabilities and networking subsystems to facilitate wired or wireless communication. For example, the background electronic devices may include: a cellular network interface (LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface (such as a near-field-communication interface). These capabilities may allow the background electronic devices to be integrated into information networks, thereby further transforming people's lives.

However, the overwhelming majority of the existing background electronic devices in people's homes, offices and vehicles have neither enhanced computing capabilities (such as processor that can execute a wide variety of applications) nor networking subsystems. Given the economics of many market segments (such as the consumer market segment), these so-called 'legacy' background electronic devices (which are sometimes referred to as 'legacy electronic devices') are unlikely to be rapidly replaced. These barriers to entry and change are obstacles to widely implementing the Internet of things.

In addition, there remain many environments (such as the interiors of trucks, trains, boxes, etc.) that currently do not regularly include electronic devices. As a consequence, it may also be difficult to extend the advantages of connectivity and enhanced computing capabilities into these environments.

Hence, there is a need for an environmental monitoring device that addresses the above-described problems.

SUMMARY

One group of described embodiments relates to an environmental monitoring device, which includes a sensor that provides sensor data for an external environment that includes the environmental monitoring device. The sensor data represents an environmental condition that is associated with operation of a legacy electronic device in the external environment. Moreover, the environmental monitoring device analyzes the sensor data and provides feedback about the operation of the legacy electronic device based on the analyzed sensor data. Furthermore, the sensor provides the sensor data without or excluding communication and/or electrical coupling between the environmental monitoring device and the legacy electronic device.

In some embodiments, the environmental monitoring device includes a processor and a memory, which stores a program module that is executed by the processor. The program module includes instructions for: receiving the sensor data, the analyzing, and the providing.

Additionally, the environmental monitoring device may include an antenna, and an interface circuit that communicates with an aggregation electronic device that is other than the legacy electronic device, where the providing involves communicating the feedback to the aggregation electronic device via the interface circuit and the antenna.

Note that the sensor data may include: a particle count, a particle size, a concentration of a chemical, a composition of the chemical, temperature, humidity, acoustic information, video, thermal information, vibration information, acceleration information, motion information, microanalysis information, mass-spectrometry information, and/or chemical-analysis information.

Moreover, the environmental condition may include: presence of an individual, presence of a chemical compound, presence of an allergen, presence of dust, presence of a fungus, a fire, presence of smoke, flooding, a water leak, a chemical leak, presence of an insect, presence of a rodent, availability of electrical power, a lighting condition, temperature deviating from a predefined target, and/or humidity deviating from a predefined target.

Furthermore, the legacy electronic device may include: a smoke detector, a thermostat, a carbon-monoxide detector, an appliance, a clock, a security alarm, a humidifier, an air filter, a switch, and/or a light.

In some embodiments, the environmental monitoring device includes a physiological output device (such as a speaker or a display) that provides sensory information, where the feedback is provided via the physiological output device.

Another embodiment provides a computer-program product for use in conjunction with the environmental monitoring device. This computer-program product may include instructions for at least some of the aforementioned operations performed by the environmental monitoring device.

Another embodiment provides a method for providing feedback, which may be performed by the processor in the environmental monitoring device. During operation, the processor receives the sensor data associated with the sensor in the environmental monitoring device, where the sensor data is for the external environment that includes the environmental monitoring device. The sensor data represents the environmental condition that is associated with operation of a legacy electronic device in the external environment, and the legacy electronic device is separate from the environmental monitoring device. Then, the processor analyzes the sensor data. Next, the processor provides the feedback about the operation of the legacy electronic device based on the analyzed sensor data.

Another embodiment provides a system that includes the environmental monitoring device and the legacy electronic device.

A second group of described embodiments relates to an electronic device that includes an antenna, and an interface circuit that communicates with a set of electronic devices, where the set of electronic devices at least includes other electronic devices than the electronic device, and the set of electronic devices are located in separate environments. Moreover, the electronic device includes a processor and a memory, which stores a program module that is executed by the processor. The program module includes instructions for: receiving sensor data from the set of electronic devices, where the sensor data represents environmental conditions in the environments; analyzing the sensor data, where the analysis involves comparing the sensor data from a given electronic device in the set of electronic devices with the sensor data from a remainder of the set of electronic devices; and determining a risk metric for an environment associated with the given electronic device based on the analyzed sensor data.

Note that the environment may be included in a physical object or the physical object may be included in the environment, and the program module may include instructions for calculating a financial value associated with the physical object based on the determined risk metric. For example, the financial value may include: a commercial value of the physical object; and/or an insurance premium for the physical object. In addition, the physical object may include: a portion of a building, the building, a container, a vehicle, a liquid, and/or a train car.

In some embodiments, the electronic device includes a sensor which provides sensor data that represents an environmental condition in an environment that includes the electronic device. Moreover, the program module may include instructions for accessing the sensor data from the sensor in the electronic device, and the analysis may include the sensor data from the sensor in the electronic device.

Furthermore, the environments may be associated with different entities.

Another embodiment provides a computer-program product for use in conjunction with the electronic device. This computer-program product may include instructions for at least some of the aforementioned operations performed by the electronic device.

Another embodiment provides a method for determining a risk metric, which may be performed by the processor in the electronic device. During operation, the processor receives the sensor data from the set of electronic devices, where the sensor data represents the environmental conditions in the external environments of the set of electronic devices, and where the set of electronic devices at least includes the electronic devices other than the electronic device. Then, the processor analyzes the sensor data, where the analysis involves comparing the sensor data from the given electronic device in the set of electronic devices with the sensor data from the remainder of the set of electronic devices. Next, the processor determines the risk metric for the external environment associated with the given electronic device based on the analyzed sensor data.

Another embodiment provides a system that includes the electronic device and the set of electronic devices.

A third group of described embodiments relates to an environmental monitoring device, which includes a sensor that provides sensor data that represents an environmental condition in an external environment that includes the environmental monitoring device. Moreover, the environmental monitoring device includes an antenna, and an interface circuit that communicates with an archive device. Furthermore, the environmental monitoring device includes a processor, where the processor includes a secure channel that processes information and communicates the processed information using an encryption key associated with the secure channel. Additionally, the environmental monitoring device includes a memory, which stores a program module that is executed by the processor. The program module includes instructions for: receiving the sensor data from the sensor; generating a digital signature associated with the secure channel; and providing, to the archive device, a certified data package for archiving in a historical record for the external environment, where the certified data package includes the sensor data, the digital signature and a time stamp.

Note that the digital signature may be generated using: a secure hash of the time stamp and an identifier of the environmental monitoring device; and/or the encryption key.

In some embodiments, the program module includes instructions for analyzing the sensor data, and the certified data package includes the analyzed sensor data. For example, the external environment may be associated with a physical object, and analyzing the sensor data may involve calculating a risk metric for the external environment. In addition, the program module may include instructions for calculating a financial value associated with the physical object based on the determined risk metric. This financial value may include: a commercial value of the physical object; and/or an insurance premium for the physical object.

Furthermore, the environmental monitoring device may include a location monitor that provides information specifying a location of the environmental monitoring device in the external environment. In these embodiments, the program module includes instructions for receiving the information specifying the location, and the certified data package includes the information specifying the location.

Alternatively or additionally, the program module may include instructions for receiving the information specifying the location of the environmental monitoring device in the external environment based on communication, via the interface circuit and the antenna, with another electronic device, and the certified data package may include the information specifying the location. For example, the other electronic device (such as a cellular telephone, tablet computer or computer) may be in the external environment and may be proximate to the environmental monitoring device.

Another embodiment provides a computer-program product for use in conjunction with the environmental monitoring device. This computer-program product may include instructions for at least some of the aforementioned operations performed by the environmental monitoring device.

Another embodiment provides a method for providing a certified data package, which may be performed by a secure channel in the processor in the environmental monitoring device. During operation, the processor receives the sensor data from the sensor in the environmental monitoring device, where the sensor data represents the environmental condition in the external environment that includes the environmental monitoring device. Then, the processor generates the digital signature associated with the secure channel, where the secure channel processes information and communicates the processed information using the encryption key associated with the secure channel. Next, the processor provides, to the archive device, the certified data package for archiving in the historical record for the external environment, where the certified data package includes the sensor data, the digital signature and the time stamp.

Another embodiment provides a system that includes the environmental monitoring device and the archive device.

A fourth group of described embodiments relates to an electronic device, which includes a sensor that provides sensor data that represents an environmental condition in an external environment that includes the electronic device. This electronic device receives information specifying a medical condition of an individual. Then, the electronic device determines a target value of the environmental condition based on the information specifying the medical condition. Moreover, the electronic device calculates a deviation from the target value based on the sensor data and the target value. If a magnitude of the deviation exceeds a threshold, the electronic device modifies an operating condition of a regulator device in the external environment that regulates the environmental condition. Next, the electronic device provides the modified operating condition.

In some embodiments, the electronic device includes a processor, and a memory that stores a program module which is executed by the processor. The program module includes instructions for: the receiving, the determining, the calculating, and the modifying.

Moreover, the electronic device may include an antenna, and an interface circuit that communicates with another electronic device. The electronic device may receive: the information specifying the medical condition from the other electronic device; and/or a forecast for the environmental condition from the other electronic device. In the later embodiments, the electronic device may modify the operating condition based on the forecast.

Note that the medical condition may include: an allergy, a chemical sensitivity, an illness, and/or a chronic disease that is affected by the environmental condition. Furthermore, the regulator device may include: a thermostat, a humidifier, an air purifier, a ventilator device, and/or an access-control device for the external environment.

Additionally, the target value may be based on a time of day and/or a season (or time of year).

In some embodiments, the information specifying the medical condition is: encrypted and/or de-identified so that the identity of the individual is protected.

Moreover, the sensor data may include: a particle count, a particle size, a concentration of a chemical, a composition of the chemical, temperature, humidity, acoustic information, video, thermal information, vibration information, acceleration information, motion information, microanalysis information, mass-spectrometry information, and/or chemical-analysis information.

Another embodiment provides a computer-program product for use in conjunction with the electronic device. This computer-program product may include instructions for at least some of the aforementioned operations performed by the electronic device.

Another embodiment provides a method for modifying the operating condition, which may be performed by the processor in the electronic device. During operation, the processor receives the information specifying the medical condition of the individual. Then, the processor determines the target value of the environmental condition in the external environment of the electronic device based on the information specifying the medical condition. Moreover, the processor calculates the deviation from the target value based on sensor data and the target value, where the sensor data is provided by the sensor in the electronic device, and the sensor data represents the environmental condition. Next, the electronic device modifies the operating condition of the regulator device in the external environment if the deviation exceeds the threshold, wherein the regulator device regulates the environmental condition. Furthermore, the processor provides the modified operating condition.

Another embodiment provides a system that includes the electronic device, the regulator device and/or other electronic device.

A fifth group of described embodiments relates to an environmental monitoring device, which includes a sensor that provides sensor data that represents an environmental condition in an external environment that includes the environmental monitoring device. Moreover, the environmental monitoring device includes an antenna, and an interface circuit that communicates with an archive device and another electronic device. Furthermore, the environmental monitoring device includes a processor, and a memory that stores a program module which is executed by the processor. The program module includes instructions for: receiving the sensor data from the sensor; protecting the sensor data; providing the protected sensor data to the archive device; receiving a request for the sensor data from the other electronic device; and providing authorization information to the archive device to release the sensor data to the other electronic device.

Note that the authorization information may be based on a predefined authorization preference of a user associated with the environmental monitoring device.

In some embodiments, the program module includes instructions for requesting user feedback about the request; and receiving the user feedback, where the authorization information is provided if the user feedback includes approval of the request.

Moreover, protecting the sensor data may involve hashing, using a secure hash function, the sensor data, a random number generated by the environmental monitoring device and an identifier of the environmental monitoring device. Furthermore, the memory may store a set of secure hash functions that includes the secure hash function, and the secure hash function may be specified by a protection preference. The program module may include instructions for receiving the protection preference from the archive device.

Additionally, the program module may include instructions for: communicating, to the archive device, information specifying how to unprotect the sensor data; and/or communicating, to the other electronic device, information specifying how to unprotect the sensor data.

In some embodiments, the request includes an address of the other electronic device, and the authorization information includes the address.

Another embodiment provides a computer-program product for use in conjunction with the environmental monitoring device. This computer-program product may include instructions for at least some of the aforementioned operations performed by the environmental monitoring device.

Another embodiment provides a method for authorizing access to sensor data, which may be performed by the processor in the environmental monitoring device. During operation, the processor receives the sensor data from the sensor in the environmental monitoring device, where the sensor data represents the environmental condition in the external environment that includes the environmental monitoring device. Then, the processor protects the sensor data. Moreover, the processor provides the protected sensor data to the archive device. Next, the processor receives the request for the sensor data from the other electronic device. Furthermore, the processor provides the authorization information to the archive device to release the sensor data to the other electronic device.

Another embodiment provides a system that includes the environmental monitoring device, the archive device and/or other electronic device.

A sixth group of described embodiments relates to an environmental monitoring device, which includes a sensor that provides sensor data for an external environment that includes the environmental monitoring device, where the sensor data represents an environmental condition that is associated with operation of an electronic device in the external environment. This environmental monitoring device analyzes the sensor data and provides a maintenance notification related to the operation of the electronic device based on the analyzed sensor data.

Note that the sensor may provide the sensor data without or excluding: communication between the environmental monitoring device and the electronic device; and/or electrical coupling between the environmental monitoring device and the electronic device.

In some embodiments, the environmental monitoring device includes a processor, and a memory that which stores a program module which is executed by the processor. The program module includes instructions for: receiving the sensor data, the analyzing, and the providing.

Moreover, analyzing the sensor data may involve comparing the sensor data to a threshold value.

Furthermore, the maintenance notification may include: an instruction to change a filter, an instruction to perform maintenance on the electronic device, an instruction to replace a power source in the electronic device, and/or an instruction to replace a sensor in the electronic device.

Additionally, the environmental monitoring device may order a replacement component for the electronic device based on the maintenance notification; and/or may record, in a historical record for the environment, the maintenance notification and a subsequent remedial action associated with the electronic device that is performed in response to the maintenance notification.

In some embodiments, the environmental monitoring device provides a command to an access-control device for the external environment based on the maintenance notification.

Note that the maintenance notification may be provided to a third party that performs maintenance (e.g., a maintenance service) on the electronic device. This third party may be other than a user associated with the environmental monitoring device and a provider of the environmental monitoring device.

In some embodiments, the environmental monitoring device includes an antenna, and an interface circuit that communicates with another electronic device, where the providing involves communicating with the other electronic device via the interface circuit and the antenna.

Another embodiment provides a computer-program product for use in conjunction with the environmental monitoring device. This computer-program product may include instructions for at least some of the aforementioned operations performed by the environmental monitoring device.

Another embodiment provides a method for providing a maintenance notification, which may be performed by the processor in the environmental monitoring device. During operation, the processor receives the sensor data associated with the sensor in the environmental monitoring device, where the sensor data is for the external environment that includes the environmental monitoring device, and the sensor data represents the environmental condition that is associated with operation of the electronic device in the external environment. Then, the processor analyzes the sensor data. Moreover, the processor provides the maintenance notification related to the operation of the electronic device based on the analyzed sensor data.

Another embodiment provides a system that includes the environmental monitoring device and the electronic device.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
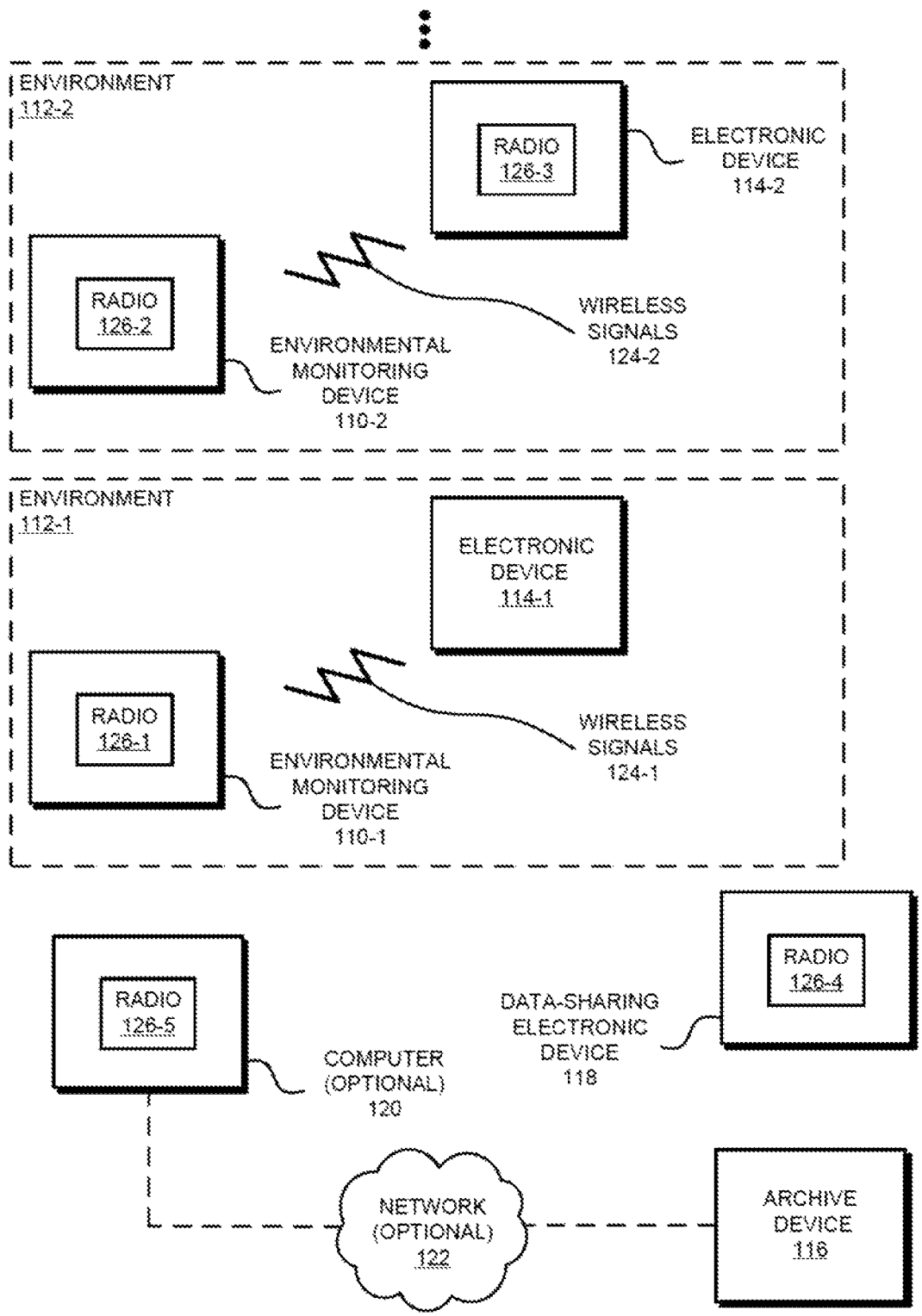
FIG. 1 is a block diagram illustrating electronic devices communicating in accordance with an embodiment of the present disclosure.

In one group of embodiments, an environmental monitoring device that monitors the operation of a legacy electronic device is described. In particular, a sensor in the environmental monitoring device provides sensor data (such as temperature, humidity, acoustic information, a particle count, a particle size, etc.) that represents an environmental condition (such as presence of an allergen, fire, flooding, a power outage, an infestation, etc.) in an external environment that includes the environmental monitoring device. This environmental condition is associated with the operation of the legacy electronic device in the external environment (such as a smoke detector, a thermostat, a carbon-monoxide detector, an appliance, a clock, a security alarm, a humidifier, an air filter, a switch, etc.). The environmental monitoring device analyzes the sensor data and provides feedback about the operation of the legacy electronic device based on the analyzed sensor data. Moreover, the sensor provides the sensor data without or excluding communication and/or electrical coupling between the environmental monitoring device and the legacy electronic device.

In this way, the environmental monitoring device facilitates monitoring, analysis and feedback of the sensor data without directly interacting with the legacy electronic device. These capabilities may allow the environmental monitoring device to provide additional services by supplementing the existing legacy electronic devices instead of requiring that these electronic devices be replaced. In addition to being more cost effective, this approach may significantly increase the rate of adoption of the environmental monitoring device, thereby enhancing commercial activity. Furthermore, the additional services may enhance customer satisfaction with both the legacy electronic devices and the environmental monitoring device.

In a second group of embodiments, an electronic device that determines a risk metric for a physical object associated with an environment is described. This electronic device receives sensor data from a set of electronic devices (which may or may not include the electronic device) that are located in separate, neighboring or proximate environments. The sensor data represents environmental conditions in these environments. By analyzing and comparing the sensor data, the electronic device assesses the environmental condition and determines the risk metric for at least one of the environments (such as a risk metric for a power failure). Furthermore, the risk metric may be used to calculate a financial value, such as a commercial value or an insurance premium of the physical object associated with at least the one environment. Note that the physical object may be included in at least the one environment or at least the one environment may include the physical object. For example, at least the one environment may include: a portion of a building, the building, a container, a vehicle, a liquid, and/or a train car.

By facilitating aggregated monitoring of at least the one environment, the electronic device can assess, on an ongoing basis, the impact of one or more environmental factors (and, more generally, the environmental condition) on the quality and/or value of the physical object. This data-driven assessment of risk may allow services to be provided to customers ranging from: an owner of the physical object, a realtor, potential buyers and/or renters of the physical object, an insurance company, an insurance broker, a shipping or transportation company, etc. Furthermore, the information collected and analyzed by the electronic device may be used to guide remedial action to protect the physical object. Thus, the electronic device may facilitate a wide variety of value-added commercial activities.

In a third group of embodiments, an environmental monitoring device that monitors an environment and maintains a secure, certified historical record of an environmental condition in the environment is described. In particular, a sensor in the environmental monitoring device provides sensor data that represents the environmental condition in the environment. This sensor data is securely processed in a secure channel in a processor in the environmental monitoring device. The secure processing may include generating a digital signature associated with the secure channel (e.g., using a secure hash function and/or an encryption key). Then, a certified data package (with the sensor data or analyzed sensor data, the digital signature, location information and an associated time stamp) is securely communicated to an archive device, and the archive device may include the certified data package in the historical record or log for the environment.

The ongoing record maintained by the environmental monitoring device and the archive device may be used to determine a risk metric for a physical object associated with the environment. For example, the physical object may be included in the environment or the environment may include the physical object. Moreover, the risk metric may be used to calculate a financial value associated with the physical object, such as a commercial value or an insurance premium.

In this way, the environmental monitoring device can assess, on an ongoing basis, the impact of one or more environmental factors (and, more generally, the environmental condition) on the quality and/or value of the physical object. This data-driven assessment of risk may allow services to be provided to customers ranging from: an owner of the physical object, a realtor, potential buyers and/or renters of the physical object, an insurance company, an insurance broker, a shipping or transportation company, etc. Furthermore, the information collected and analyzed by the electronic device may be used to guide remedial action to protect the physical object. Thus, the electronic device may facilitate a wide variety of value-added commercial activities.

In a fourth group of embodiments, an electronic device that modifies an operating condition of a regulator device based on a medical condition of an individual is described. The electronic device receives or accesses information specifying the medical condition (such as an allergy, a chemical sensitivity, an illness, a chronic disease, etc.). The information is then used to determine a target value of an environmental condition in an environment. Subsequently, the electronic device provides sensor data representing the environmental condition. This sensor data is compared to the target value and, based on the comparison, the operating condition of a regulator device in the environment is modified. For example, the regulator device may regulate the environmental condition (such as a thermostat, a humidifier, an air purifier, a ventilator device, a window opener, a door opener, etc.). If a magnitude of a deviation of the sensor data from the target value exceeds a threshold, the operating condition may be modified to reduce the deviation. Moreover, the electronic device may provide the modified operating condition to the individual or directly to the regulator device.

In this way, the electronic device may allow the individual, directly or indirectly, to monitor and maintain the environmental condition in a manner that increases their comfort and overall health given the constraints imposed by the medical condition. In addition, the electronic device may perform these functions either with or without direct interaction (such as communication or electrical coupling) to the regulator device. Thus, the electronic device may be capable of being used flexibly in a dynamic feedback control system or with a legacy electronic device. Consequently, the electronic device may assist the individual in a cost-effective and valuable way, thereby increasing their satisfaction with the electronic device and/or a legacy electronic device.

In a fifth group of embodiments, an environmental monitoring device that enables access to protected sensor data stored in a remote archive is described. This environmental monitoring device collects sensor data that represents an environmental condition in an environment. After protecting the sensor data (e.g., using a secure hash function, a random number and/or an identifier of the environmental monitoring device), the environmental monitoring device provides the protected sensor data to an archive device. Subsequently, when the environmental monitoring device receives a request for the sensor data from another electronic device, the environmental monitoring device may provide authorization information to the archive device to release the sensor data to the other electronic device. Note that the authorization information may be based on a predefined authorization preference of a user associated with the environmental monitoring device or on feedback from the user about the request (such as user approval of the request). The environmental monitoring device may also provide information specifying how to unprotect the sensor data to the archive device and/or the other electronic device.

In this way, the environmental monitoring device may facilitate collection and secure, low-cost storage of the protected sensor data, while allowing authorized recipients (such as the other electronic device) access to the sensor data. These capabilities may allow the environmental monitoring device to facilitate a wide range applications and services that leverage the protected sensor data to the user of the environmental monitoring device, as well as other individuals and organizations. Consequently, the environmental monitoring device may promote commercial activity, data sharing, and cross-platform services.

In a sixth group of embodiments, an environmental monitoring device that provides maintenance notifications is described. The environmental monitoring device provides sensor data that represents an environmental condition in an environment. This sensor data is associated with operation of an electronic device in the external environment. Then, the environmental monitoring device analyzes the sensor data and provides the maintenance notification related to the operation of the electronic device based on the analyzed sensor data. For example, the environmental monitoring device may compare the sensor data to a threshold (such as a maximum value or a minimum value of the environmental condition). If the threshold is exceeded, the environmental monitoring device may provide the maintenance notification, such as an instruction to: change a filter, perform maintenance, replace a battery, order a replacement component, etc. In addition, the environmental monitoring device may record, in a historical record for the environment, the maintenance notification and a subsequent remedial action (if any) associated with the electronic device that is performed in response to the maintenance notification. Note that the environmental monitoring device may provide the sensor data without or excluding interaction (such as communication or electrical coupling) with the electronic device.

In these ways, the environmental monitoring device may facilitate continued and/or improved operation of the electronic device and, thus, may help maintain the environment. Moreover, by allowing the environmental monitoring device to provide the maintenance notification without requiring interaction with the electronic device, the environmental monitoring device may be able to help automate maintenance of a legacy electronic device. These capabilities may be a valuable service for an owner of the electronic device, as well as repair services and component suppliers. Consequently, the environmental monitoring device may increase customer satisfaction and may increase commercial activity.

Communication between electronic devices (such as the environmental monitoring device and the archive device) may utilize wired, optical and/or wireless communication. For example, the wireless communication may involve communicating packets or frames that are transmitted and received by radios in the electronic devices in accordance with a communication protocol, such as: Bluetooth™ (from the Bluetooth Special Interests Group of Kirkland, Wash.), an Institute of Electrical and Electronics Engineers (IEEE) 802.15 standard (such as ZigBee® from the ZigBee® Alliance of San Ramon, Calif.), an Institute of Electrical and Electronics Engineers (IEEE) 802.11 standard, a power-line communication standard, an infra-red communication standard, a universal serial bus (USB) communication standard, a near-field-communication standard or specification (from the NFC Forum of Wakefield, Mass.), another wireless adhoc network standard, and/or another type of wireless interface. In some embodiments, the communication protocol may be compatible with a $2^{nd}$ generation or mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. For example, the communication protocol may include Long Term Evolution or LTE. In the discussion that follows, Zig-Bee® is used as an illustrative example. In addition, the communication may occur via a wide variety of frequency bands, including frequencies associated with the so-called 'white space' in frequencies bands associated with analog television broadcasting.

The communication between the electronic devices is shown in FIG. 1, which presents a block diagram illustrating communication among environmental monitoring devices 110, electronic devices 114 (such as regulator devices e.g., electronic device 114-2, and/or legacy electronic devices, e.g., electronic device 114-1) and data-sharing electronic device 118 using wireless signals, and communication with optional computer 120 and optional network 122 (such as the Internet, a wireless local area network, an Ethernet network, an intra-net, an optical network, etc.) and aggregating or archive device 116 (which may or may not involve wireless signals). As described further below with reference to FIGS. 11-22, environmental monitoring devices 110 may monitor environmental conditions in one or more environments 112 (such as a portion of a building, the building, a container or a package, a vehicle, a liquid, and/or a train car) that include electronic devices 114. (Note that one or more of environmental monitoring devices 110 may be immersed in a liquid, and environments 112 may be at fixed locations or time-varying locations.) For example, at least some of environmental monitoring devices 110 may include sensors that provide sensor data that reflects the environmental conditions in the one or more environments 112. In general, the sensor data may be provided without or excluding interaction (such as communication and/or electrical coupling) between environmental monitoring devices 110 and electronic devices 114. Thus, sensors in environmental monitoring devices 110 may indirectly infer information about the operation and/or the performance of electronic devices 114 based on the monitored environmental conditions. However, in some embodiments at least some of environmental monitoring devices 110 interact directly with at least some of electronic devices 114 (via communication or electrical coupling), thereby facilitating direct measurement of the sensor data, as well as feedback control of these electronic devices by at least some of environmental monitoring devices 110. In some embodiments, one or more of environmental monitoring devices 110 is integrated into one or more other electronic device, such as one or more of electronic devices 114.

The sensor data may be analyzed locally by at least one of environmental monitoring devices 110 and/or remotely by archive device 116. Moreover, the sensor data and/or the analyzed sensor data may be communicated among environmental monitoring devices 110. In particular, environmental monitoring devices 110 may form a ZigBee® mesh network, with ZigBee® end devices communicating with a ZigBee® coordinator (such as environmental monitoring device 110-1) via one or more optional ZigBee® routers. Then, environmental monitoring device 110-1 may communicate (wirelessly and/or via optional computer 120 and optional network 122) the sensor data and/or the analyzed sensor data to archive device 116.

In addition, the sensor data and/or the analyzed sensor data may be communicated or shared with one or more other electronic devices, such as data-sharing electronic device 118 (e.g., a cellular telephone or a portable electronic device) and/or remote servers or computers not shown in FIG. 1. For example, the sensor data and/or the analyzed sensor data may be communicated to data-sharing electronic device 118 by at least some of environmental monitoring devices 110, such as the one or more optional ZigBee® routers and/or the Zig-Bee® coordinator. (Thus, at least some of environmental monitoring devices 110 may function as sensor-data hubs for other environmental monitoring devices 110.) Alternatively, the sensor data and/or the analyzed sensor data may be communicated to data-sharing electronic device 118 by archive device 116 using wired, optical and/or wireless communication.

As described further below with reference to FIGS. 15 and 16, and 19 and 20, in general, the sensor data and/or the analyzed sensor data that is communicated and/or stored by environmental monitoring devices 110 and/or archive device 116 may be protected. For example, the sensor data may be encrypted, digitally signed and/or securely hashed (such as using a one-way cryptographic hash function) by environmental monitoring devices 110. Furthermore, archive device 116 may store the sensor data and/or the analyzed sensor data in secure, certified historical records or logs of the environmental conditions in environments 112. In principle, the information stored by archive device 116 may be protected. However, in some embodiments, users of environmental monitoring devices 110, who, in general, control how their data is used and shared, may instruct environmental monitoring devices 110 to provide, via the mesh network, information to archive device 116 that allows archive device 116 to unprotect the sensor data and/or the analyzed sensor data. Similarly, in response to requests from authorized recipients for the sensor data and/or the analyzed sensor data (such as a request from data-sharing electronic device 118), archive device 116 may provide access to the stored sensor data and/or the analyzed sensor data. If the sensor data and/or the analyzed sensor data is protected, the associated environmental monitoring devices 110 may provide protection information to data-sharing electronic device 118 that allows data-sharing electronic device 118 to unprotect the sensor data and/or the analyzed sensor data.

Environmental monitoring devices 110 may allow a variety of services to be offered to: users associated with environmental monitoring devices 110 (such as owners or renters of these environmental monitoring devices), suppliers of components or spare parts, maintenance personnel, insurance companies, insurance brokers, realtors, leasing agents, apartment renters, hotel guests, businesses, organizations, governments, potential buyers of physical objects, a shipping or transportation company, etc. For example, as described further below with reference to FIGS. 11 and 12, based on the analyzed sensor data feedback about the operation of one or more of electronic devices 114 (such as a legacy electronic device) may be provided by one or more of environmental monitoring devices 110 on displays, using speakers and, more generally, on physiological output devices that provide sensory information. Thus, a user may be alerted if a legacy electronic device is not functioning properly. More generally, the feedback may indicate the presence of an environmental condition in one of environments 112, such as: presence of an allergen, fire, flooding, a power outage, a chemical contaminant, an infestation, etc.

Alternatively or additionally, as described further below with reference to FIGS. 13 and 14, one or more of environmental monitoring devices 110 and/or archive device 116 may assess the impact of one or more environmental factors (and, more generally, the environmental condition) on the quality and/or value of a physical object associated with one of environments 112 on an ongoing basis. For example, one or more of environmental monitoring devices 110 and/or archive device 116 may determine a risk metric for the physical object by comparing the sensor data from at least a subset of electronic devices 110. This risk metric may be used to calculate a financial value, such as a commercial value or an insurance premium relating to the physical object (e.g., insuring the physical object itself, or insuring the active use of the physical object, such as liability insurance).

As described further below with reference to FIGS. 17 and 18, in some embodiments one or more of environmental monitoring devices 110 and/or archive device 116 may maintain an environmental condition in one of environments 112 based on a medical condition of an individual (such as an allergy, a chemical sensitivity, an illness, a chronic disease, etc.). In particular, the operating condition of a regulator device (such as one of electronic devices 114, e.g., a thermostat, a humidifier, an air purifier, a ventilator device, a window opener, a door opener, etc.) that regulates an environmental condition may be modified based on a comparison of the sensor data and a target value of the environmental condition in one of environments 112 (which is determined based on the medical condition). Then, the modified operating condition may be provided to the individual or, when possible, directly to the regulator device (thus, the modified operation condition may include a control signal for the regulator device). Note that the medical condition of an individual can include a psychological comforting effect (e.g., warming up a room before the user enters it), or even a placebo effect in which the environmental factor has no known benefits (and may even have drawbacks or random effects) according to scientific studies, but by making a user more comfortable the modified environmental factors provide psychological comfort to the user (which can be categorized as a form of placebo effect). Furthermore, the environmental condition in one of environments 112 can be based on a user preference, e.g., lowering the temperature of a bedroom before bedtime, etc.

Additionally, as described further below with reference to FIGS. 21 and 22, in some environments one or more of environmental monitoring devices 110 provide a maintenance notification based on the analyzed sensor data, which is associated with the operation of one of electronic devices 114 (such as a legacy electronic device or an electronic device that is included in a feedback loop with one of environmental monitoring devices 110) and which represents an environmental condition in one of environments 112. For example, the maintenance notification may include an instruction to: change a filter, perform maintenance, replace a battery, order a replacement component, etc. In addition, the maintenance notification and any subsequent remedial action (such as a repair or service performed on one of electronic devices 114) may be stored in a historical record or log for one or more of environments 112 (such as a historical record maintained by archive device 116).

In these ways, environmental monitoring devices 110 and/or archive device 116 may be used to: implement an information network with one or more legacy electronic devices; securely aggregate and selectively disseminate sensor data about environmental conditions: calculate the financial impact of environmental conditions; and facilitate monitoring and maintaining of one or more environmental conditions in environments 112.

As noted previously, the communication between environmental monitoring devices 110, electronic devices 114, archive device 116, data-sharing electronic device 118 and/or optional computer 120 may involve the exchange of packets. These packets may be included in frames in one or more wireless channels.

Figure 2:
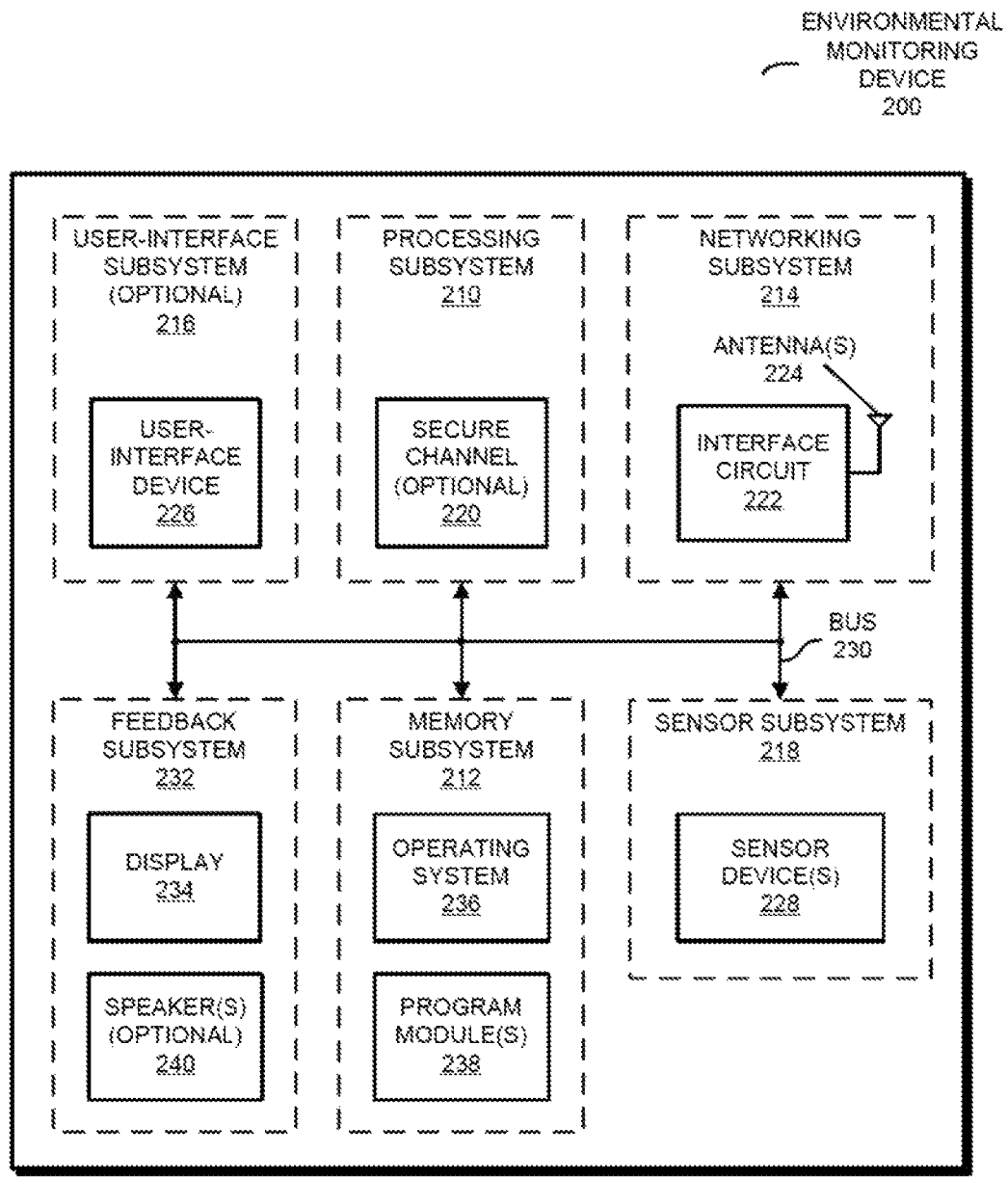
FIG. 2 is a block diagram illustrating an environmental monitoring device of FIG. 1 in accordance with an embodiment of the present disclosure.

Moreover, as described further below with reference to FIG. 2, environmental monitoring devices 110, archive device 116, data-sharing electronic device 118, optional computer 120 and/or optionally some of electronic devices 114 (such as electronic device 114-2) may include subsystems, such as: a networking subsystem, a memory subsystem, a processing subsystem, an optional user-interface subsystem, and a sensor subsystem. In addition, these electronic devices may include radios 126 in the networking subsystems. More generally, environmental monitoring devices 110, archive device 116, data-sharing electronic device 118, optional computer 120 and/or optionally some of electronic devices 114 can include (or can be included within) any electronic devices with networking subsystems that enable wirelessly communication with another electronic device. This can comprise transmitting frames on wireless channels to enable the electronic devices to make initial contact, followed by exchanging subsequent data/management frames (such as connect requests or petitions to establish a connection or link), configuring security options (e.g., encryption on a link or in a mesh network), transmitting and receiving packets or frames, etc.

As can be seen in FIG. 1, wireless signals 124 (represented by a jagged line) are transmitted from/received by radios 126 in environmental monitoring devices 110, data-sharing electronic device 118, optional computer and/or optionally some of electronic devices 114 (such as electronic device 114-2). In general, wireless communication among these electronic devices may or may not involve a connection being established between the electronic devices, and therefore may or may not involve communication via a wireless network. (Note that the communication between optional computer 120 and archive device 116 may occur via optional network 122, which may involve wired or optical communication with a different communication protocol than wireless signals 124.)

Furthermore, the processing of a packet or frame in an electronic device (such as environmental monitoring device 110-1) may include: receiving wireless signals 124 with the packet or frame; decoding/extracting the packet or frame from received wireless signals 124 to acquire the packet or frame; and processing the packet or frame to determine information contained in the packet or frame (such as at least a portion of a certified data packet).

As noted previously, in general communication among the electronic devices may be protected. This may involve encryption using an encryption key (such as an encryption key associated with one of environmental monitoring devices 110 and/or a secure channel in a processor in one of environmental monitoring devices 110). The encryption key may use symmetric or asymmetric encryption techniques. Alternatively or additionally, a secure hash function (such as SHA-256) may be used. For example, the secure hash may supplement encryption that is associated with a network interface in one or more of environmental monitoring devices 110.

Although we describe the environment shown in FIG. 1 as an example, in alternative embodiments, different numbers or types of electronic devices may be present. For example, some embodiments comprise more or fewer electronic devices.

We now describe embodiments of the environmental monitoring device, the archive device, and other electronic devices in FIG. 1. FIG. 2 presents a block diagram illustrating environmental monitoring device 200, such as one of environmental monitoring devices 110. This electronic device includes processing subsystem 210, memory subsystem 212, a networking subsystem 214, an optional user-interface subsystem 216, sensor subsystem 218 (i.e., a data collection subsystem), and feedback subsystem 232. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

In addition, processing subsystem 210 may include an optional secure channel 220 that performs secure processing of information, securely communicates with other components in environmental monitoring device 200, and more generally performs secure services. This secure channel may include one or more processors, a secure boot ROM, one or more security peripherals, and/or other components. The security peripherals may be hardware-configured to assist in the secure services performed by optional secure channel 220. For example, the security peripherals may include: authentication hardware implementing various authentication techniques, encryption hardware configured to perform encryption, secure-interface controllers configured to communicate over a secure interface to other components, and/or other components. In some embodiments, instructions executable by optional secure channel 220 are stored in a trust zone in memory subsystem 212 that is assigned to optional secure channel 220, and optional secure channel 220 fetches the instructions from the trust zone for execution. Optional secure channel 220 may be isolated from the rest of processing subsystem 210 except for a carefully controlled interface, thus forming a secure region for optional secure channel 220 and its components. Because the interface to optional secure channel 220 is carefully controlled, direct access to components within optional secure channel 220 (such as a processor or a secure boot ROM) may be prevented. In some embodiments, optional secure channel 220 encrypts and/or decrypts authentication information communicated with optional user-interface subsystem 216 and/or received via networking subsystem 214, and encrypts and/or decrypts information (such as sensor data) communicated with sensor subsystem 218.

Memory subsystem 212 includes one or more devices for storing data and/or instructions for processing subsystem 210, networking subsystem 214, optional user-interface subsystem 216 and/or sensor subsystem 218. For example, memory subsystem 212 can include dynamic random access memory (DRAM), static random access memory (SRAM), and/or other types of memory. In some embodiments, instructions for processing subsystem 210 in memory subsystem 212 include: one or more program modules 238 or sets of instructions (such as an environmental monitoring application, a financial application, a data-logging application, a medical application, a data-sharing application, and/or a maintenance application), which may be executed in an operating environment (such as operating system 236) by processing subsystem 210. Note that the one or more computer programs may constitute a computer-program mechanism or a program module. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in environmental monitoring device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by environmental monitoring device 200 as fast-access storage for often-used data, while the mass-storage device is used to store less frequently used data.

Networking subsystem 214 includes one or more devices configured to couple to and communicate on a wired, optical and/or wireless network (i.e. to perform network operations), including an interface circuit 222 (such as a ZigBee® communication circuit) and one or more antennas 224. For example, networking subsystem 214 can include: a ZigBee® networking subsystem, a Bluetooth™ networking system (which can include Bluetooth™ Low Energy, BLE or Bluetooth™ LE), a cellular networking system (e.g., a 5G/4G network such as UMTS, LTE, etc.), a USB networking system, a networking system based on the standards described in IEEE 802.11 (e.g., a Wi-Fi® networking system), an Ethernet networking system, an infra-red communication system, a power-line communication system and/or another communication system (such as a near-field-communication system or an adhoc-network networking system).

Moreover, networking subsystem 214 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, environmental monitoring device 200 may use the mechanisms in networking subsystem 214 for performing simple wireless communication between environmental monitoring device 200 and other electronic devices, e.g., transmitting advertising frames, petitions, beacons and/or information associated with near-field communication.

Optional user-interface subsystem 216 may include one or more processors, controllers and devices for receiving information for a user of environmental monitoring device 200. For example, optional user-interface subsystem 216 may include a user-interface device 226, such as: a keypad, a touch-sensitive display, optical character recognition, image recognition, gesture recognition, biometric recognition (such as a fingerprint, a palm print, a retinal pattern, etc.), and/or voice recognition. The information may include: authentication information from the user (such as a passcode for unlocking access to environmental monitoring device 200 and/or some of the functionality of environmental monitoring device 200); user-feedback about a request for access to sensor data associated with environmental monitoring device 200; and/or user preferences for operation of environmental monitoring device 200 (such as alarm settings, when and/or how to provide notifications, etc.). This information may be securely communicated to processing subsystem 210 (such as by encrypting the information). In addition, the information communicated may also include an encryption key that is specific to environmental monitoring device 200 and/or components in environmental monitoring device 200, such as optional secure channel 220.

Furthermore, sensor subsystem 218 may include one or more sensor devices 228 (or a sensor array), which may include one or more processors and memory. For example, the one or more sensor devices 228 may include: a thermal sensor (such as a thermometer), a humidity sensor, a barometer, a camera or video recorder (such as a CCD or CMOS imaging sensor), one or more microphones (which may be able to record acoustic information in mono or stereo), an infrared sensor, a microscope, a particle detector, an optical particle sensor, an ionization particle sensor, a smoke detector, a chemical sensor or detector, a chemical-analysis device, a mass spectrometer, a microanalysis device, a nano-plasmonic sensor, a genetic sensor (such as a micro-array), an accelerometer, a position or a location sensor (such as a location sensor based on the Global Positioning System or GPS), a gyroscope, a motion sensor, a vibration sensor, a fluid flow sensor, a photo-detector, a Geiger counter, a radio-frequency radiation detector, and/or another device that measures a physical effect or that characterizes an environmental factor or physical phenomenon (either directly or indirectly).

Moreover, the one or more sensor devices 228 may include redundancy to address sensor failure or erroneous readings, or to provide improved accuracy and/or precision. Note that sensor data acquired by the one or more sensor devices 228 may be securely communicated to processing subsystem 210 (such as by encrypting the sensor data). In addition, the sensor data communicated may also include a digital signature that is specific to environmental monitoring device 200 and/or components in environmental monitoring device 200, such as optional secure channel 220.

Feedback subsystem 232 may include a display 234 for displaying information, such as feedback about an environmental condition in an environment that includes environmental monitoring device 200 or a maintenance notification associated with a regulator device in the environment. In particular, feedback subsystem 232 may include a display driver and display 234, such as: a liquid-crystal display, an e-ink display, an organic light emitting diode display, a braille output device, a laser projection display, a multi-touch touchscreen, a color-wheel display, etc. Note that display subsystem 232 may be included in optional user-interface subsystem 216.

During operation of environmental monitoring device 200, processing subsystem 210 may execute one or more program modules 238, such as an environmental monitoring application. In particular, environmental monitoring application may instruct one or more sensor devices 228 to measure or acquire sensor data that represents one or more environmental conditions in an environment that includes environmental monitoring device 200. For example, the environmental condition may include: presence of an individual (such as a resident or a potential burglar), presence of a chemical compound (such as exhaust, carbon monoxide, radon, smoke, a non-volatile organic compound and/or a volatile organic compound), presence of an allergen (such as dander or pollen), presence of dust, presence of a fungus, a fire, presence of smoke, flooding, a water leak, a chemical leak, presence of an insect or rodent (and, more generally, an infestation), discharge of a firearm, a possible altercation or criminal act (such as domestic violence), a medical emergency, availability of electrical power (such as whether there is a power failure), a lighting condition (such as whether the lights are on or off), temperature deviating from a predefined target, and/or humidity deviating from a predefined target. In some embodiments, the environmental condition is associated with the operation of a regulator device (which may or may not be a legacy electronic device). The regulator device (and, more generally, one of electronic devices 114 in FIG. 1) may include: a smoke detector, a thermostat, a carbon-monoxide detector, an appliance, a clock, a security alarm, a humidifier, an air filter, a switch, a light, etc. Note that the monitoring of the sensor data may be continuous, periodic (such as after a time interval has elapsed) or as needed (such as event-driven monitoring).

The sensor data may be communicated to processing subsystem 210. Then, the environmental monitoring application may optionally analyze the sensor data, e.g., calculating a discrete or a Fourier transform, determining a histogram, performing filtering or signal processing, perform data compression, calibrating one or more of sensor devices 228, identifying one or more of sensor devices 228 that are not working or which are outputting erroneous sensor data, applying another transformation, calculating statistics (such as moments of a distribution), performing supervised learning (such as Bayesian analysis), performing noise reduction, normalizing the sensor data, converting units, etc. (Alternatively or additionally, the sensor data may be communicated to another electronic device using networking subsystem 214 and the analysis may be performed remotely, e.g. by archive device 116 in FIGS. 1 and 4.) For example, the analysis may determine whether an environmental condition is present in the environment. Then, the environmental monitoring application may provide feedback to a user of environmental monitoring device 200 or directly to one of electronic devices 114 in FIG. 1 (if this electronic device is able to communicate with environmental monitoring device 200 via networking subsystem 214). In particular, the environmental monitoring application may instruct feedback subsystem 232 to provide sensory information, such as a text or graphical message, a video displayed on display 234 and/or a sound or audio message output by optional speakers 240. For example, the sensory information may include: a range of values, numerical measurements, shades of gray (or grayscale), colors, chemical formulas, images, textures, patterns (which may correspond to one or more environmental conditions), tessellations with gradients of larger or smaller element sizes, and/or tessellations of increasing or decreasing element sizes (such as tessellation that are adjusted to be larger or smaller as a given environmental condition increases or decreases). Thus, in some embodiments the sensory information includes a change in the color of environmental monitoring device 200. Alternatively or additionally, the feedback may be communicated using networking subsystem 214 and presented to the user (or other individuals) on another electronic device, such as data-sharing electronic device 118 (FIG. 1) or a different electronic device (such as the user's cellular telephone, tablet computer or computer) that is used for remote visualization of: the sensor data, the analyzed sensor data, the environmental condition and/or the feedback.

In some embodiments, the environmental monitoring application may provide, via networking subsystem 214, the feedback to one or more of environmental monitoring devices 110 (FIG. 1) and/or other electronic devices (such as computers or servers associated with or operated on behalf of: component suppliers, retailers, insurance companies, maintenance organizations, shipping companies, landlords or property owners, a corporate-compliance organization, inspectors, businesses, government agencies, etc.). For example, the environmental monitoring application may utilize a Short Message Service, email, a social network and/or a messaging service with a restricted number of characters per message. Alternatively or additionally, the feedback may be posted to a web page or website (and, more generally, a location on a network), and one or more recipients may be notified via networking subsystem 214, e.g., a link to the location may be provided to the recipients.

Figure 3:
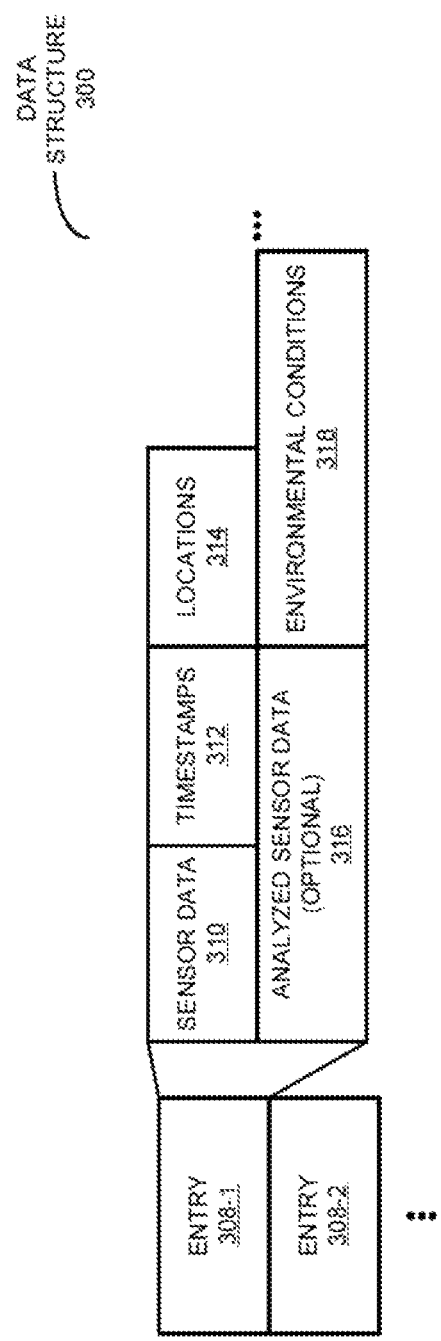
FIG. 3 is a block diagram illustrating a data structure with sensor data in the electronic device of FIG. 2 in accordance with an embodiment of the present disclosure.

Note that the sensor data and/or the analyzed sensor data may be stored, at least temporarily, in a data structure in memory subsystem 212. This is shown in FIG. 3, which presents a data structure 300. In particular, data structure 300 may include entries 308 with: sensor data 310, timestamps 312, locations 314, optional analyzed sensor data 316, and/or environmental conditions 318.

Referring back to FIG. 2, in some embodiments the analysis is based on comparisons of sensor data associated with environmental conditions in multiple environments (which may be separate from each other, but proximate or nearby one another). For example, sensor data from other environmental monitoring devices 110 in FIG. 1 may be received via networking subsystem 214. If the sensor data indicates that multiple adjacent houses in a neighborhood do not have electrical power, it is more likely that the cause is a power failure than it is if only one house does not have electrical power. Thus, the environments may be associated with separate entities, such as the owners of the houses or the users of environmental monitoring devices 110 (FIG. 1) in these buildings.

Furthermore, in some embodiments the analysis is performed by a financial application that is executed by processing subsystem 210. In particular, the financial application may use the sensor data and/or the environmental condition for one or more of environments 112 (FIG. 1) to determine a risk metric for a physical object associated with at least the environment associated with environmental monitoring device 200. For example, the physical object may be included in the environment or may include the environment. In the latter case, the physical object may include: a portion of a building (e.g., an apartment, a hotel room, an office suite, a storage unit, etc.), the building, a container (such as a box, a package or a shipping container), a vehicle (such as a car or truck), a liquid, and/or a train car. Moreover, the risk metric may be used to calculate a financial value for the physical object, such as a commercial value or an insurance premium of the physical object.

In some embodiments, the one or more program modules 238 include a data-logging application. In conjunction with archive device 116 (FIGS. 1 and 4), the data-logging application may maintain a secure, certified historical record or log for the environment and/or the physical object (such as a 'housefax' record for an apartment or a building). Notably, sensor subsystem 218 may securely communicate the sensor data to processing subsystem 210. Using optional secure channel 220, a digital signature for the sensor data may be generated, e.g., using a secure hash function and/or an encryption key that are associated with environmental monitoring device 200 and/or optional secure channel 220. Then, the data-logging application may instruct networking subsystem 214 to communicate a certified data package (with the sensor data or analyzed sensor data, the digital signature, location information and/or an associated time stamp) to archive device 116 (FIG. 1) for inclusion in the historical record or log for the environment.

Additionally, in some embodiments the one or more program modules 238 include a medical application. When executed by processing subsystem 210, the medical application may modify an operating condition of a regulator device based on a medical condition of an individual. For example, environmental monitoring device 200 may, via networking subsystem 214, receive information (such as from another electronic device that stores a medical record of the individual) specifying the medical condition. This information may include: a diagnosis, details of a prescription, medical care received by the individual, results of testing (such as genetic testing), etc. The information may be encrypted or de-identified to protect the privacy of the individual. In these embodiments, the individual may subsequently provide or allow environmental monitoring device 200 to receive an encryption key to decrypt the information, the individual may subsequently indicate that the information specifies their medical condition (such as using optional user-interface subsystem 216 or by using networking subsystem 214 to communicate with environmental monitoring device 200 via another electronic device used by the individual), and/or an association of the individual with the information may be made by using networking subsystem 214 to access additional records stored on another electronic device (such as account information of the individual). Note that the medical condition may include: an allergy, a chemical sensitivity, an illness, and a chronic disease that is affected by the environmental condition, and/or an environmental preference of the individual based on the medical condition.

Then, the medical application uses the information to determine a target value of the environmental condition in the environment. If the environmental condition deviates from the target value (as determined by comparing the sensor data and the target value), the medical application may modify the operating condition of the regulator device (such as one of electronic devices 114 in FIG. 1), which regulates the environmental condition in the environment. For example, the regulator device may include: a thermostat, a humidifier, an air purifier, a ventilator device (such as a fan), a motor, a window opener, a door opener and/or an access-control device for the environment. The medical application may instruct feedback subsystem 232 to present the modified operating condition to the user and/or may instruct networking subsystem 214 to communicate the modified operating condition to the regulator device (if the regulator device is capable of communicating with environmental monitoring device 200). Thus, the modified operation condition may include a control signal for the regulator device.

In some embodiments, the medical application determines the target value based on other parameters, such as: the time of day, the season (i.e., the time of year), and/or a forecast for the environmental condition (such as a weather or an allergen forecast) received from one or more other electronic devices via networking subsystem 214.

Moreover, the one or more program modules 238 may include a data-sharing application. This data-sharing application may enable a designated or authorized recipient to access protected sensor data that is stored in archive device 116 (FIG. 1). In particular, when executed by processing subsystem 210, the data-sharing application may instruct sensor subsystem 218 to measure or collect sensor data that represents the environmental condition. Then, the data-sharing application may protect the sensor data and/or analyzed sensor data. For example, the sensor data and/or the analyzed sensor data may be encrypted using an encryption key by processing subsystem 210 and/or optional secure channel 220. Alternatively or additionally, the sensor data and/or the analyzed sensor data may be protected using a secure hash function in conjunction with an identifier of environmental monitoring device 200 and/or a random number (or a pseudorandom number, both of which are henceforth referred to as a 'random number') generated by processing subsystem 210. Next, data-sharing application may instruct networking subsystem 214 to provide the protected sensor data and/or the analyzed sensor data to archive device 116 (FIG. 1).

Subsequently, when environmental monitoring device 200 receives, via networking subsystem 214, a request for the sensor data from data-sharing electronic device 118 (FIG. 1), the data-sharing application may access a predefined authorization preference of a user of environmental monitoring device 200 that is stored in memory subsystem 212. If the predefined authorization preference of the user authorizes the recipient associated with the request, the data-sharing application may provide, via networking subsystem 214, authorization information to archive device 116 (FIG. 1) to release the sensor data to data-sharing electronic device 118 (FIG. 1). Alternatively, the data-sharing application may instruct feedback subsystem 232 to request feedback about the request from the user. This user feedback may be received via optional user-interface subsystem 216. If the user feedback approves the request, the data-sharing application may provide, via networking subsystem 214, authorization information to archive device 116 (FIG. 1) to release the sensor data to data-sharing electronic device 118 (FIG. 1). (Thus, the user of environmental monitoring device 200 may control when other parties are allowed to access the sensor data.) Note that the data-sharing application may also provide, via networking subsystem 214, protection information specifying how to unprotect the sensor data to archive device 116 (FIG. 1) and/or to data-sharing electronic device 118 (FIG. 1). For example, the data-sharing application may provide the encryption key and/or may indicate the secure hash function, the random number and/or the identifier. In some embodiments, this protection information is received from the user of environmental monitoring device 200, e.g., via networking interface 214 and/or optional user-interface subsystem 216.

In some embodiments, the one or more program modules 238 includes a maintenance application. This maintenance application may instruct sensor subsystem 218 to measure the sensor data, which is associated with operation of one of electronic devices 114 (FIG. 1). Then, the maintenance application analyzes the sensor data and provides a maintenance notification related to the operation of the one of electronic devices 114 (FIG. 1) based on the analyzed sensor data. For example, the maintenance application may compare the sensor data to a threshold. If the threshold is exceeded, the maintenance application may provide the maintenance notification, such as an instruction to: change a filter, perform maintenance, replace a battery (and, more generally, a power source), replace a sensor, and/or order a replacement component (such as a sensor or a filter). When providing the maintenance notification, the maintenance application may instruct feedback subsystem 232 to present the maintenance notification to the user or maintenance personnel, and/or may instruct networking subsystem 214 to communicate the maintenance notification to the one of electronic devices 114 in FIG. 1 (if this electronic device is capable of communicating with environmental monitoring device 200). Furthermore, the maintenance application may also optionally provide a command, via networking subsystem 214, to an access-control device (such as a window opener or a door opener) for the environment based on the maintenance notification. Thus, if a fan is not working properly (as indicated by a rising temperature or the environmental condition), the maintenance application may alert the user or the maintenance personnel, and may automatically open one or more windows.

Within environmental monitoring device 200, processing subsystem 210, memory subsystem 212, networking subsystem 214, optional user-interface subsystem 216, sensor subsystem 218 and feedback subsystem 232 may be coupled using one or more interconnects, such as bus 230. These interconnects may include an electrical, optical, and/or electro-optical connection that the subsystems can use to communicate commands and data among one another. Note that different embodiments can include a different number or configuration of electrical, optical, and/or electro-optical connections among the subsystems. In some embodiments, environmental monitoring device 200 can detect tampering with secure components (such as optional secure channel 220 and/or bus 230) and may destroy encryption/decryption keys or information (such as a stored sensor data or authentication information) if tampering is detected.

Environmental monitoring device 200 can be (or can be included in) any electronic device with at least one network interface. For example, environmental monitoring device 200 can be (or can be included in): a sensor (such as a smart sensor), a tablet computer, a smartphone, a cellular telephone, an appliance, a regulator device, a consumer-electronic device, a portable computing device, test equipment, a digital signal processor, a controller, a personal digital assistant, a laser printer (or other office equipment such as a photocopier), a personal organizer, a toy, a set-top box, a computing device (such as a laptop computer, a desktop computer, a server, and/or a subnotebook/netbook), a light (such as a nightlight), an alarm, a smoke detector, a monitoring device, and/or another electronic device.

Although specific components are used to describe environmental monitoring device 200, in alternative embodiments, different components and/or subsystems may be present in environmental monitoring device 200. For example, environmental monitoring device 200 may include one or more additional processing subsystems, memory subsystems, networking subsystems, user-interface subsystems, sensor subsystems, and/or feedback subsystems. Additionally, one or more of the subsystems may not be present in environmental monitoring device 200. Moreover, in some embodiments, environmental monitoring device 200 may include one or more additional subsystems that are not shown in FIG. 2. For example, environmental monitoring device 200 can include: one or more optional speakers 240 (and, more generally, a physiological output subsystem that provides sensory information to the user), a power source (such as battery, or a DC power supply or a switched-mode power supply that may be electrically coupled by an adaptor to a wall-socket plug, electrical wiring, a generator, a USB port, a photodiode, a photovoltaic cell, etc.), one or more motors that rotate one or more color wheels (or color-wheel indicators) with low power consumption (such as a brushed motor, a brushless motor, a piezo-type ratcheting motor, etc.), and/or an alarm subsystem. Note that a given motor may rotate a color wheel using an open-loop control technique or a closed-loop control technique based on an encoder, such as: an optical encoder, a mechanical encoder, a potentiometer, etc. Although separate subsystems are shown in FIG. 2, in some embodiments, some or all of a given subsystem or component can be integrated into one or more of the other subsystems or components in environmental monitoring device 200. For example, in some embodiments the one or more program modules 238 are included in operating system 236.

Moreover, the circuits and components in environmental monitoring device 200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214 (such as a radio) and, more generally, some or all of the functionality of environmental monitoring device 200. Moreover, the integrated circuit may include hardware and/or software mechanisms that are used for transmitting wireless signals from environmental monitoring device 200 to, and receiving signals at environmental monitoring device 200 from other electronic devices. Aside from the mechanisms herein described, radios are generally known in the art and hence are not described in detail. In general, networking subsystem 214 and/or the integrated circuit can include any number of radios. Note that the radios in multiple-radio embodiments function in a similar way to the radios described in single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, a petition, a beacon, etc.)

While a communication protocol compatible with ZigBee® was used as an illustrative example, the described embodiments of environmental monitoring device 200 may use a variety of network or communication interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Figure 4:
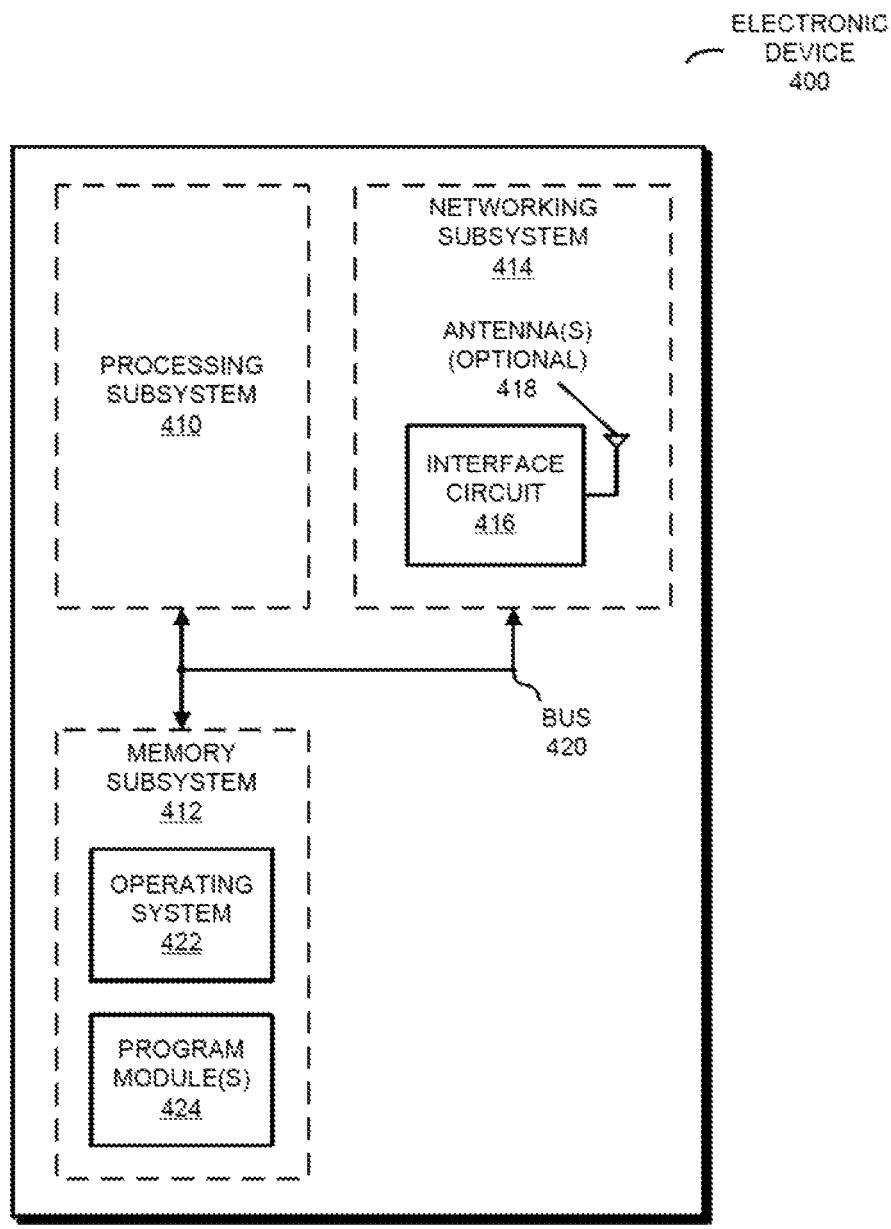
FIG. 4 is a block diagram illustrating an archive device of FIG. 1 in accordance with an embodiment of the present disclosure.

Furthermore, while the preceding discussion focused on the hardware, software and functionality in environmental monitoring device 200, archive device 116 (FIG. 1) and/or optional computer 120 (FIG. 1) may have the same or similar hardware (processors, memory, networking interfaces, etc.) and/or software to support the operations performed by these electronic devices or systems. This is shown in FIG. 4, which presents a block diagram illustrating electronic device 400, such as archive device 116 (FIG. 1). In particular, electronic device 400 includes processing subsystem 410, memory subsystem 412 and/or a networking subsystem 414. Processing subsystem 410 includes one or more devices configured to perform computational operations. For example, processing subsystem 410 can include one or more microprocessors, application-specific integrated circuits (ASCs), microcontrollers, programmable-logic devices, and/or one or more digital signal processors (DSPs).

Memory subsystem 412 includes one or more devices for storing data and/or instructions for processing subsystem 410 and/or networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules 424 or sets of instructions (such as an archiving application, an analysis application, a data-sharing application and/or a notification application), which may be executed in an operating environment (such as operating system 422) by processing subsystem 410. Note that the one or more computer programs may constitute a computer-program mechanism or a program module. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data. Note that memory subsystem 412 may include multiple storage devices at one or more locations. Thus, data storage by memory subsystem 412 may be distributed, such as a cloud-based data-storage system.

Networking subsystem 414 includes one or more devices configured to couple to and communicate on a wired, optical and/or wireless network (i.e., to perform network operations), including an interface circuit 416 and one or more optional antennas 418. For example, networking subsystem 414 can include: a ZigBee® networking subsystem, a Bluetooth™ networking system (which can include Bluetooth™ Low Energy, BLE or Bluetooth™ LE), a cellular networking system (e.g., a 5G/4G network such as UMTS, LTE, etc.), a USB networking system, a networking system based on the standards described in IEEE 802.11 (e.g., a Wi-Fi® networking system), an Ethernet networking system and/or another communication system.

Moreover, networking subsystem 414 includes processors, controllers, radios/antennas, sockets/plugs, and/or other devices used for coupling to, communicating on, and handling data and events for each supported networking or communication system. Note that mechanisms used for coupling to, communicating on, and handling data and events on the network for each network system are sometimes collectively referred to as a 'network interface' for the network system.

During operation of electronic device 400, processing subsystem 410 may execute one or more program modules 424, such as an archiving application. This archiving application may receive, via networking interface 414, data packets from one of more of environmental monitoring devices 110 (FIG. 1). These data packets may include sensor data and/or analyzed sensor data. In some embodiments, processing subsystem 410 executes an analysis application, which analyzes the received sensor data.

Figure 5:
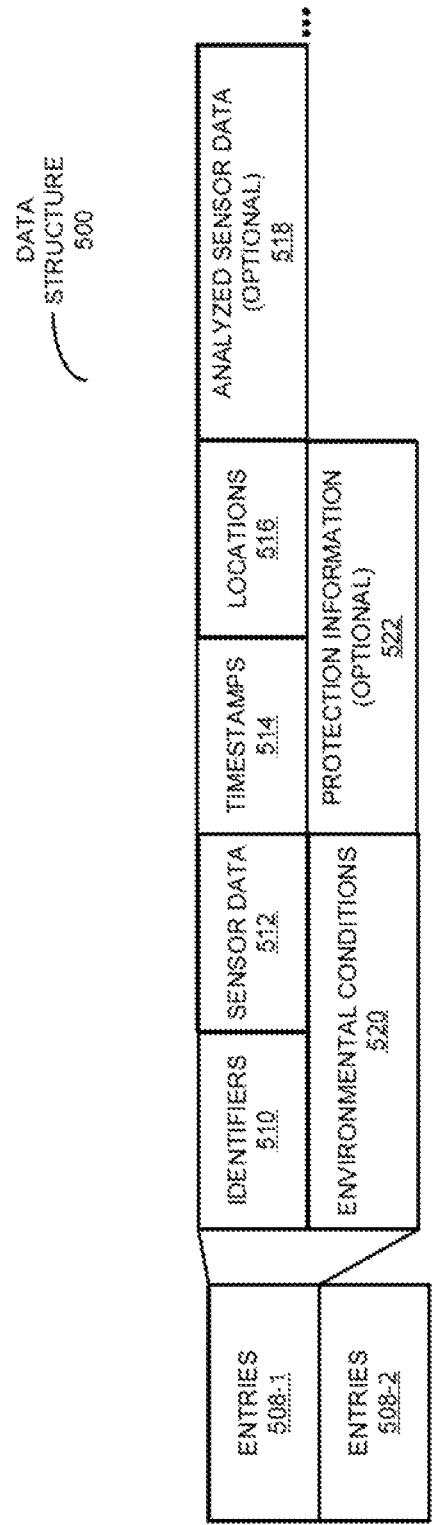
FIG. 5 is a block diagram illustrating a data structure with a historical record in the archive device of FIG. 4 in accordance with an embodiment of the present disclosure.

Then, archiving application may store the sensor data and/or the analyzed sensor data in a data structure in memory subsystem 412. This is shown in FIG. 5, which presents a block diagram illustrating data structure 500. In particular, data structure 500 may include entries 508 with: identifiers 510 of environmental monitoring devices, sensor data 512, timestamps 514, locations 516, optional analyzed sensor data 518, environmental conditions 520 and/or optional protection information 522.

Referring back to FIG. 4, in some embodiments the received data packets include protected information. For example, the sensor data and/or the analyzed sensor data may be encrypted using an encryption key associated with one of environmental monitoring devices 110 (FIG. 1) and/or a secure channel in the one of environmental monitoring devices 110 (FIG. 1). Alternatively or additionally, there may be a digital signature associated with the sensor data and/or the analyzed sensor data, and/or the sensor data and/or the analyzed sensor data may be protected using a secure hash function. In these embodiments, optional protection information 522 (FIG. 5) may include information that can confirm the source(s) of the received data packets (such as one or more of environmental monitoring devices 110 in FIG. 1) and/or can be used to unprotect the sensor data and/or the analyzed sensor data. Note that optional protection information 522 (FIG. 5) may be received, via networking interface 414, from one of environmental monitoring devices 110 (FIG. 1). This protection information may include the encryption key or an encryption key associated with the encryption key (which can be used to confirm the digital signature and/or decrypt encrypted information). Networking device 414 can utilize: encrypted tunneling in at least one networking interface, a network switch and/or network router between one of environmental monitoring devices 110 and archive device 116 in FIG. 1. Similarly, optional protection information 522 (FIG. 5) may specify the secure hash function, may include the identifier for one of environmental monitoring devices 110 (FIG. 1) and/or may include the random number (which also can be used to unprotect information).

In an exemplary embodiment, a public-private encryption-key technique is used. In particular, a certified, secure data package may be signed by one of environmental monitoring devices 110 (FIG. 1) using a public encryption key of archive device 116 (FIG. 1), and the digital signature may be verified and the certified, secure data package may be decrypted using the private encryption key of archive device 116 (FIG. 1). However, in other embodiments a symmetric encryption technique is used. Thus, the same encryption key may be used to sign, encrypt and/or decrypt the certified, secure data package.

In some embodiments, the one or more program modules 424 includes a data-sharing application. This data-sharing application may receive, via networking subsystem 414, authorization information for a recipient of sensor data and/or analyzed sensor data. In response to the authorization information, the data-sharing application may provide, via networking subsystem 414, the requested sensor data and/or analyzed sensor data to the recipient. Alternatively, the data-sharing application may provide, via networking subsystem 414, a pointer to a location in memory subsystem 412 where the recipient can access the requested sensor data and/or analyzed sensor data. Note that the data-sharing application may also optionally provide the optional protection information 522 (FIG. 5) to the recipient (which may allow the recipient to confirm the source(s) and/or to unprotect protected information).

Additionally, in some embodiments the one or more program modules 424 includes a notification application. This notification application may receive, via networking subsystem 414, information, such as feedback associated with one or more environmental conditions in one or more of environments 112 (FIG. 1) and/or a notification (such as a maintenance notification). In response, the notification application may communicate, via networking subsystem 414, the information and/or one or more reports based on the information (such as daily, weekly or monthly summaries of analyzed sensor data, which may be included in documents or files) to: one or more of environmental monitoring devices 110 (FIG. 1), data-sharing electronic device 118 (FIG. 1) and/or other electronic devices (such as computers or servers associated with or operated on behalf of: component suppliers, retailers, insurance companies, maintenance organizations, shipping companies, landlords or property owners, a corporate-compliance organization, inspectors, businesses, government agencies, etc.). For example, the communication of the information may utilize a Short Message Service, email, a social network and/or a message service with a restricted number of characters per message. Alternatively, the information may be posted to a web page or website (and, more generally, a location on a network), and one or more recipients may be notified via networking subsystem 414, e.g., a link to the location may be provided to the recipients.

When the notification includes a maintenance notification, the archiving application may store information specifying the maintenance notification in a historical record or log for the environment. In addition, the archiving application may store any subsequent remedial action (such as a repair or service performed on an electronic devices in one of the environments) in a historical record or log for the environment in memory subsystem 412.

Within electronic device 400, processing subsystem 410, memory subsystem 412, and/or networking subsystem 414 may be coupled using one or more interconnects, such as bus 420. These interconnects may include an electrical, optical, and/or electro-optical connection that the subsystems can use to communicate commands and data among one another. Note that different embodiments can include a different number or configuration of electrical, optical, and/or electro-optical connections among the subsystems.

Electronic device 400 can be (or can be included in) any electronic device with at least one network interface. For example, electronic device 400 can be (or can be included in): a sensor (such as a smart sensor), a tablet computer, a smartphone, a cellular telephone, an appliance, a regulator device, a consumer-electronic device, a portable computing device, test equipment, a digital signal processor, a controller, a personal digital assistant, a facsimile machine, a laser printer (or other office equipment such as a photocopier), a personal organizer, a toy, a set-top box, a computing device (such as a laptop computer, a desktop computer, a server, and/or a sub-notebook/netbook), an alarm, a light, a monitoring device, and/or another electronic device.

Although specific components are used to describe electronic device 400, in alternative embodiments, different components and/or subsystems may be present in electronic device 400. For example, electronic device 400 may include one or more additional processing subsystems, memory subsystems, and/or networking subsystems. Additionally, one or more of the subsystems may not be present in electronic device 400. Moreover, in some embodiments, electronic device 400 may include one or more additional subsystems that are not shown in FIG. 4, such as a power supply and/or a user-interface subsystem (which a user may use to modify settings of one or more of environmental monitoring devices 110 in FIG. 1, such as settings for alarms or notifications). Although separate subsystems are shown in FIG. 4, in some embodiments, some or all of a given subsystem or component can be integrated into one or more of the other subsystems or components in electronic device 400. For example, in some embodiments the one or more program modules 424 are included in operating system 422.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

Note that an integrated circuit may implement some or all of the functionality of electronic device 400.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

Figure 6:
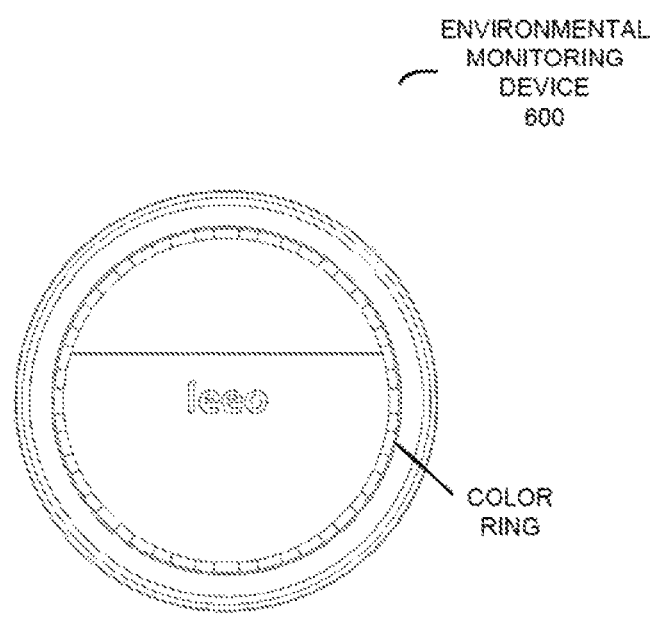
FIG. 6 is a drawing illustrating a front view of an environmental monitoring device in FIG. 1 in accordance with an embodiment of the present disclosure.
Figure 7:
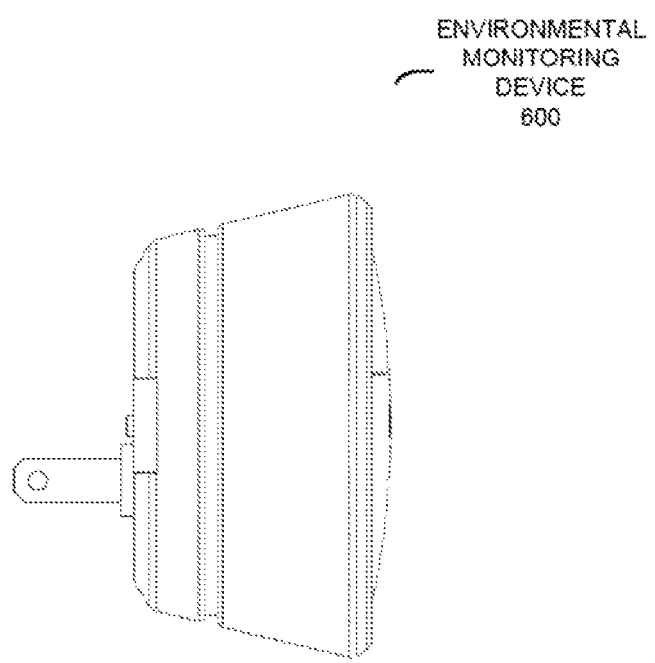
FIG. 7 is a drawing illustrating a side view of the environmental monitoring device in FIG. 6 in accordance with an embodiment of the present disclosure.
Figure 8:
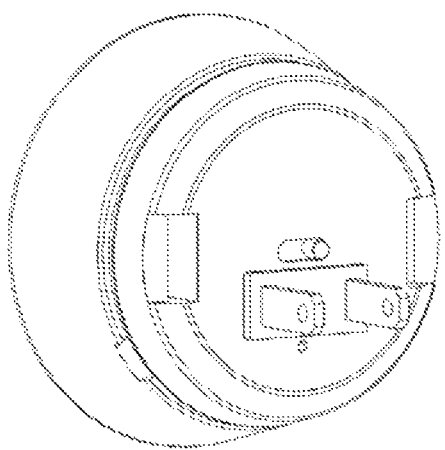
FIG. 8 is a drawing illustrating a rear view of the environmental monitoring device in FIG. 6 in accordance with an embodiment of the present disclosure.

An exemplary embodiment of the environmental monitoring device is shown in FIGS. 6-8, which respectively show front, side and rear views of environmental monitoring device 600, which may be one of environmental monitoring devices 110 (FIG. 1). Alternatively, the environmental monitoring device may include a display. This shown in FIGS. 9 and 10, which respectively show front and side views of environmental monitoring device 900, which may be one of environmental monitoring devices 110 (FIG. 1).

Embodiments of the environmental monitoring device may include a grating in the chassis or housing that prevents large particles, soil and mud from damaging or otherwise obscuring inputs to one or more sensor devices in the environmental monitoring device. Alternatively or additionally, the chassis or housing may facilitate airflow or fluid flow through vents or openings to one or more sensor devices in the environmental monitoring device. In addition, the environmental monitoring device may include a forced-fluid driver (such as a fan) to facilitate airflow or fluid-flow through the vents. However, in other embodiments airflow or fluid flow is facilitated using convection (e.g., by heating the air or the fluid), or the airflow or fluid flow may occur passively.

Figure 11:
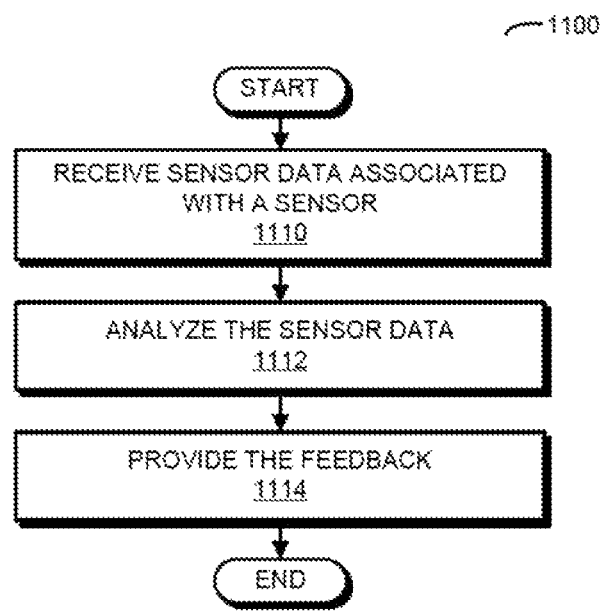
FIG. 11 is a flow diagram illustrating a method for providing feedback in accordance with an embodiment of the present disclosure.

We now further describe operation of the environmental monitoring device and the archive device. FIG. 11 presents a flow diagram illustrating a method 1100 for providing feedback, which may be performed by a processor in the environmental monitoring device. For example, the processor may execute a program module that includes instructions for operations in method 1100. During operation, the processor may receive (or access) sensor data associated with a sensor (operation 1110) in the environmental monitoring device, where the sensor data is for an external environment that includes the environmental monitoring device. The sensor data represents an environmental condition that is associated with operation of a legacy electronic device in the external environment, and the legacy electronic device is separate from the environmental monitoring device. Note that the sensor may provide the sensor data without or excluding communication and/or electrical coupling between the environmental monitoring device and the legacy electronic device.

Then, the processor may analyze the sensor data (operation 1112).

Next, the processor may provide the feedback (operation 1114) about the operation of the legacy electronic device based on the analyzed sensor data. For example, the feedback may be provided on the environmental monitoring device and/or may be communicated to another electronic device, such as an aggregation electronic device or an archive device (which is other than the legacy electronic device).

Figure 12:
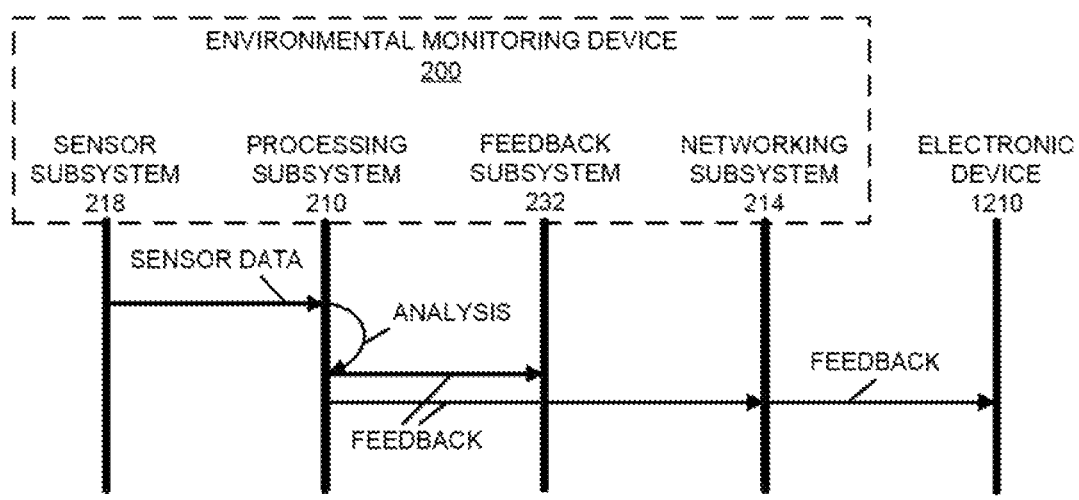
FIG. 12 is a drawing illustrating communication between an environmental monitoring device and an aggregation device during the method of FIG. 11 in accordance with an embodiment of the present disclosure.

Communication between environmental monitoring device 200 and archive device 116 during method 1100 (FIG. 11) is shown in FIG. 12. In particular, sensor subsystem 218 may provide sensor data to processing subsystem 210. Then, processing subsystem 210 may analyze the sensor data, and may provide the feedback. For example, processing subsystem 210 may provide information (such as the sensor data, analyzed sensor data and/or the feedback) to feedback subsystem 232 for presentation to a user. Alternatively or additionally, processing subsystem 210 may provide the information to networking subsystem 214. Next, networking subsystem 214 may communicate the information to electronic device 1210, such as archive device 116, data-sharing electronic device 118 or another electronic device (not shown).

In an exemplary embodiment of method 1100 (FIG. 11), the environmental monitoring device may be used to monitor the quality of an environment. For example, a consumer may want the environmental monitoring device to provide the feedback so that they know, at a glance, the quality of their environment (e.g., good air quality with low levels of organic compounds and allergens). Alternatively, when there are potentially harmful chemicals or allergens present (such as a chemical concentration exceeding safe limits), the consumer may want the environmental monitoring device to provide the feedback so that they know there is an issue that needs to be addressed. In contrast, an industrial user may want the ability to visualize the sensor data and/or one or more environmental conditions, and may want the ability to archive the sensor data and/or the one or more environmental conditions in an archive device.

Using the chemical concentration as an illustrative example, one or more sensors or sensor devices in the environmental monitoring device may output a signal (which is one form of the feedback) in response to the presence of a concentration or level of the chemical level in the air. The processing subsystem and/or signal-conditioning circuits in the environmental monitoring device may analyze this sensor data, identify the environmental condition and may provide signals to a display in the environmental monitoring device.

Alternatively or additionally, the processing subsystem and/or the signal-conditioning circuits may sound a 'danger' alarm or audio message by providing signals (which are another form of the feedback) to one or more speakers (or audio transducers) in the environmental monitoring device. This danger alarm may occur even if the display is not currently working. In addition, the environmental monitoring device may communicate an alert (which is another form of the feedback) about the environmental condition to a monitoring station, which may contact someone associated with the environment (such as the user), who can investigate the environmental condition, evacuate the environment and/or contact a chemical response team.

In another illustrative example, the one or more sensor devices may detect air particles (such as dust, dander and other allergens) and may send an alert or notification (which is a form of the feedback), such as an alarm or an audio message, to a user, a person or an electronic device (such as a regulator device) in the environment with instructions to: ventilate the area, turn on a filtration system, run a humidifier, and/or another environmental clearing actions. Thus, the feedback may include one or more recommended remedial actions to address the environmental condition. Note that the remedial actions may include positive instructions (such as 'turn on the ventilation') and/or negative instructions (i.e., things not to do if certain actions are likely to make the environmental condition worse). For example, the remedial actions may include suggested safety tips and precautions, such as advising: a human to wear a mask while vacuuming in an environment with dangerous levels of dust; a human or a machine to ventilate an area; that the rate of application of a chemical product (such as paint or varnish) be reduced; and/or the use of personal protection equipment (such as a filtration mask or a self-contained breathing apparatus).

In other examples, the environmental condition may include when water is boiling on a stove, when food is overcooked or burning in a kitchen. For example, the environmental monitoring device may receive an acoustic signal indicating a timer has gone off on the oven or an appliance (such as a dryer). Similarly, an acoustic signal (and/or video) may detect the presence of a leaking faucet or pipe. In some embodiments, the environmental condition is the presence of a weather condition (such as a tornado) and the feedback includes instructions to a user to seek shelter and control signals to a regulator device to open or break the windows in a building to help equalize air-pressure differences. Additionally, the environmental condition includes when a user is at home, and the feedback may modify the environment in the home accordingly (such as turning on one or more lights, turning on the heat or the air conditioning, etc.). This last example may be facilitated by feed-forward information that is received by the environmental monitoring system from another electronic device. This feed-forward information may indicate that the user is heading home.

Note that the environmental monitoring device may provide different alerts for different environmental conditions and these alerts can be provided concurrently. Moreover, the alerts may be associated with different: sounds, lights, messages and/or notification techniques. For example, a smoke-detection sound may be different from a sound played when a dangerous level of dust is detected or when food is ready. In particular, a hex texture or pattern may be displayed on the environmental monitoring device when benzene is detected. As the levels increase the hex pattern can change in size, scale, luminosity, pitch, color, dimension, perspective (such as by converting from two dimensional to three dimensional), orientation or another sensory parameter. Furthermore, the color of the display can change (either the background color or the foreground color) in response to changes in the one or more environmental conditions. For example, as the level of detected benzene increases on an absolute scale, the colors may change from a light green to yellow, then to orange, and then to red (with red indicating a harmful level of benzene present in the air). The tint, saturation, hue, contrast, brightness, transparency, and fade of the colors on the display may also be increased or decreased, thereby intuitively conveying the environmental condition.

Figure 9:
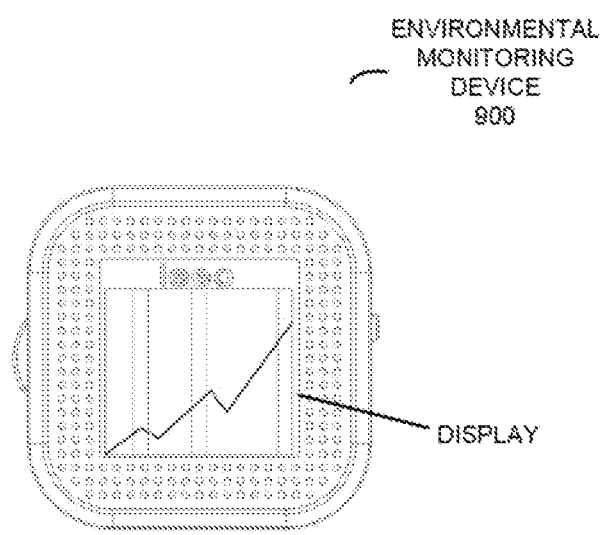
FIG. 9 is a drawing illustrating a front view of an environmental monitoring device in FIG. 1 in accordance with an embodiment of the present disclosure.
Figure 10:
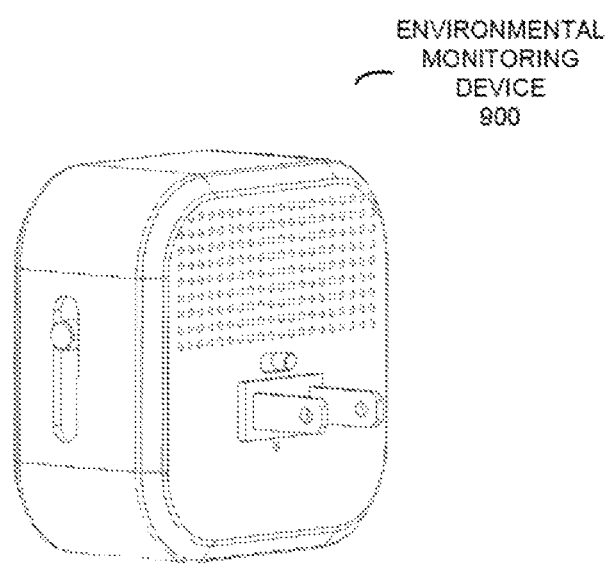
FIG. 10 is a drawing illustrating a side view of the environmental monitoring device in FIG. 9 in accordance with an embodiment of the present disclosure.

As shown in FIG. 9, in some embodiments the environmental monitoring device displays a graphic (such as: a pie chart, a bar chart, a scatter plot, a time-series plot, a tabular summary, a spectrum, a spectrogram and/or another type of graphical analysis) to provide the user with information about the one or more environmental conditions. Alternatively or additionally, the graphic may include images of chemicals, along with color scales or numbers. The image of a given chemical can grow or shrink in size in proportion to the chemical levels or concentrations detected. Furthermore, the feedback may include a graph that includes an anonymous comparison of an environmental condition with neighbors or similar classes of users to enable a user to compare the environment that includes the environmental monitoring device with comparable environments. These comparisons may offer information about relative health or safety of the environment, and/or may be of general interest.

In some embodiments, the feedback is provided via a color-wheel indicator that is rotated by a motor based on a signal that indicates the strength of an environmental condition or using a color-wheel graphic. For example, an indicator or a marker aligned with the color-wheel indicator may indicate which area in the color wheel corresponds to the current environmental condition. Alternatively, as shown in FIG. 6, a color-wheel indicator may include a rotatable or selectively illuminated ring (which is sometimes referred to as a 'color ring') with a band of color or shades of grayscale on the outside of the color wheel so that a user can identity the approximate level of environmental condition based on the color(s) or grayscale values displayed on the ring. In another display option, the color-wheel indicator may include a color or texture-based gauge. Furthermore, the environmental monitoring device may include multiple color-wheel indicators in the feedback subsystem that can be used together to display additional information, or to provide additional resolution and/or precision to the feedback. In an exemplary embodiment, a transparent color wheel with additional colors may be rotated (possibly at a different angular velocity from other color wheels) to modify the colors presented. Similarly, shades of gray or transparent gradients of increasing opacity of red, green, and/or blue (or cyan, magenta, and/or yellow) may be used around the ring of a given color wheel.

The display in the feedback subsystem may include a user-interface object such as an icon (and, more generally, a selection mechanism) that allows the user to select the type of feedback. For example, a selection box or a slider bar may allow the user to select options or settings such as: basic, intermediate or advanced feedback (depending on the technical level of the user or the application of the environmental monitoring device). The user may also use a user interface in the environmental monitoring device and/or the display to select feedback and notification options or settings, such as: danger alarms and alerts, threshold levels for detecting environmental conditions, optimal settings for a particular environmental monitoring device or environment (such as calibration settings, power-consumption settings, etc.) or a generic environmental monitoring device or environment, etc. Alternatively, the thresholds may be determined based on sensor data and/or environmental conditions associated with multiple environmental monitoring devices, e.g., using a supervised learning technique (such as support vector machines, classification and regression trees, a neural network, regression analysis, Bayesian analysis, etc.). Note that the environmental monitoring device may also display operating information, such as: sensor life, uptime, battery life remaining, network connectivity, danger alarms enabled or disabled, and/or status messages.

While the preceding discussion illustrated display of the feedback on the environmental monitoring device, in other embodiments the feedback is provided to another electronic device (such as the user's cellular telephone). This capability enables remote monitoring of the environment, such as while the user runs errands or is travelling.

Figure 13:
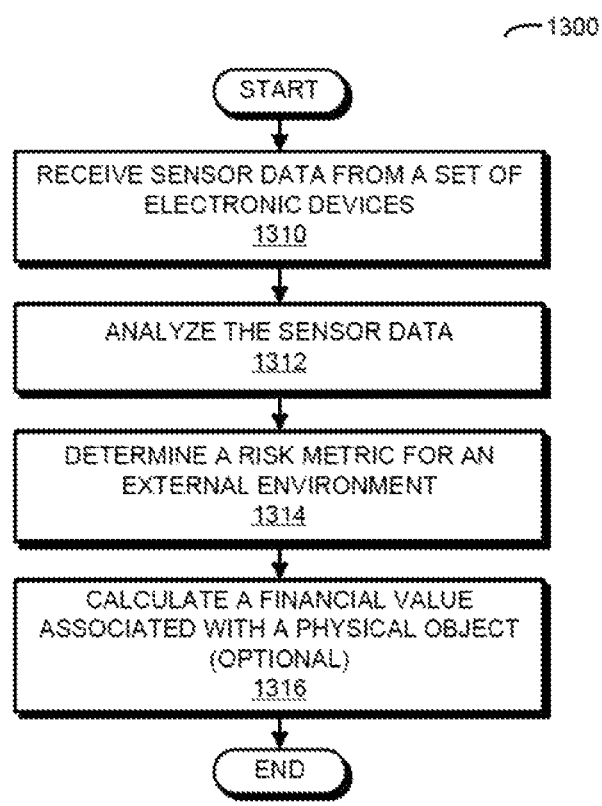
FIG. 13 is a flow diagram illustrating a method for determining a risk metric in accordance with an embodiment of the present disclosure.

FIG. 13 presents a flow diagram illustrating a method 1300 for determining a risk metric, which may be performed by a processor in an electronic device (such as the environmental monitoring device or the archive device). For example, the processor may execute a program module that includes instructions for operations in method 1300. During operation, the processor may receive (or access) sensor data from a set of electronic devices (operation 1310), where the sensor data represents environmental conditions in external environments of the set of electronic devices, and where the set of electronic devices at least includes electronic devices other than the electronic device (and may optionally include the electronic device). (At the minimum, the set of electronic devices includes at least one electronic device.) The set of electronic devices may be located in separate external environments, such as different apartments in a building or different houses in a neighborhood. Consequently, the external environments may be associated with different entities, such as the different occupants of the apartments or the different owners of the houses. Note that, in order to maintain user control over the sensor data from the external environments, the users may have to choose to opt in or grant authorization before their sensor data is used to determine the risk metric.

Then, the processor may analyze the sensor data (operation 1312), where the analysis involves comparing the sensor data from a given electronic device in the set of electronic devices with the sensor data from a remainder of the set of electronic devices. More generally, the processor may analyze the sensor data from at least one electronic device, such as at least one environmental monitoring device.

Next, the processor may determine the risk metric for the external environment (operation 1314) associated with the given electronic device based on the analyzed sensor data.

Furthermore, the processor may optionally calculate a financial value associated with a physical object (operation 1316) based on the determined risk metric. In particular, the external environment may be included in the physical object or the physical object may be included in the external environment. For example, the financial value may include: a commercial value of the physical object (such as a rental price, a resale value, a quality classification for use a tiered-pricing technique, a discount to apply to a damaged, a discount to apply to an improperly stored or handled item, etc.); and/or an insurance premium relating to the physical object or an insurance premium for the use of a physical object in the environment (such as liability insurance).

Figure 14:
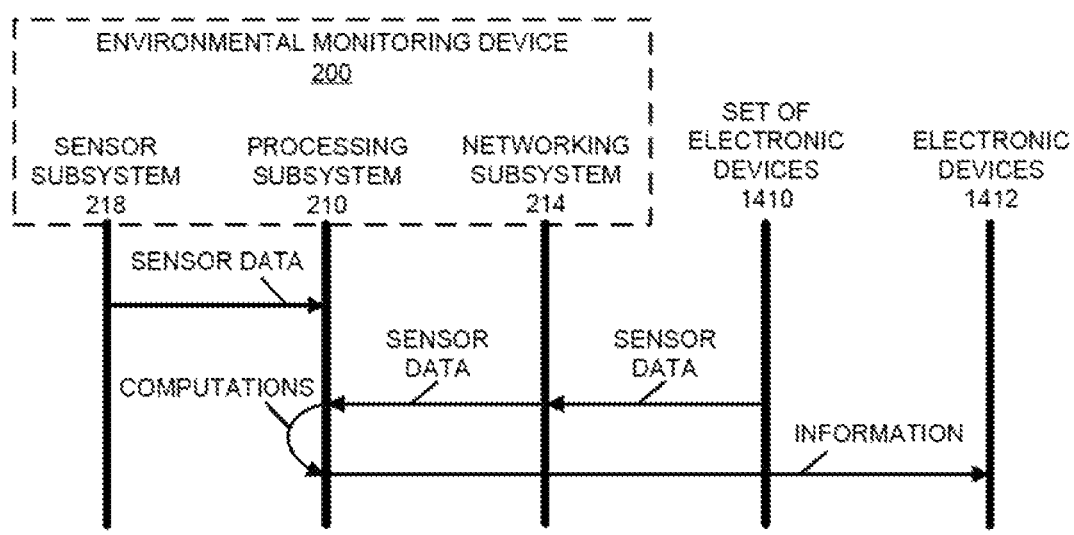
FIG. 14 is a drawing illustrating communication between an electronic device and a set of electronic devices during the method of FIG. 13 in accordance with an embodiment of the present disclosure.

FIG. 14 presents a drawing illustrating communication between an electronic device and a set of electronic devices during method 1300 (FIG. 13). In the following discussion, environmental monitoring device 200 is used as an illustrative example. In particular, networking subsystem 214 may receive the sensor data for set of electronic devices 1410 (such as environmental monitoring devices in the external environments), and may provide the sensor data to processing subsystem 210. Then, processing subsystem 210 may perform one or more computations, such as: analyzing the sensor data, determining the risk metric and/or calculating the financial value. Next, processing subsystem 210 may provide information (such as the risk metric and/or the financial value) to networking subsystem 214 for communication to one or more electronic devices 1412, such as: the user of one of environmental monitoring devices 110 (FIG. 1), data-sharing electronic device 118 (FIG. 1), and/or one or more computers associated with or operated on behalf of other parties or entities than the user.

In an exemplary embodiment of method 1300 (FIG. 13), the electronic device generates an environmental quality rating for the physical object and/or the environment (which is an example of the risk metric) as a function of time. More generally, the electronic device can generate an environmental quality report for the environment.

Then, the electronic device calculates the financial value for the physical object (such as a premium estimate for a residential or commercial property) based on the environmental quality. In this way, the sensor data and/or one or more environmental conditions can be used to assess the financial impact of: occupancy of a building or hotel (e.g., by detecting the presence of individuals), how environmentally friendly the building is (e.g., relative power consumption), a so-called 'sick building,' and/or infestation (which may be detected chemically, by the sounds, movements and/or vibrations made by insects or rodents, using video, etc.).

For example, the electronic device may assign a commercial value to real estate, antiques and/or perishable goods, which may derive value from the quality of their environments. In particular, the qualities of air, water, cleanliness, etc. have an impact on real-estate values. A verifiable environmental quality report for a property showing excellent, neutral or poor environmental quality can have a direct effect on the price of both residential and commercial real estate, as well as rental, leasing and hospitality rates. It may be advantageous for a real-estate owner or seller to demonstrate the environmental quality of their properties. The electronic device may assign a financial premium estimate for a good environmental score, and a financial penalty estimate for a low or non-existent environmental score, thereby allowing buyers and sellers to properly value property in many different transactions and environments.

Similarly, perishable goods can be damaged or spoiled if not stored properly. Indeed, many food products (such as grains, eggs, meat, fish, seafood, dairy products, and produce) are sensitive to environmental conditions and may cause illness if consumed after improper handling or storage. The electronic device may verify that perishable products were stored in proper environments, which may allow these products to be sold at a premium relative to other products that lack such verified environmental quality. For example, Kobe beef stored in optimal conditions may be certified as premium stored, and may be sold for a higher premium depending on the quality of the environment. Thus, the electronic device may use the sensor data to differentiate quality.

Furthermore, many valuable documents or antiques require specific environments to ensure they maintain their condition and value. An antique that has been stored in an optimal environment can be expected to sell for a premium. This may be assessed using the electronic device.

In other examples, the electronic device may use sensor data from one or more environmental monitoring devices to assess the environmental quality of: a chemical, water, food, medicines (such as those that need to be maintained at certain temperatures), biological agents, packages or shipping containers (which may be sensitive to vibration or shock), etc.

This environmental quality rating and/or the financial value may be shared with the user and/or other parties (e.g., as a subscription service to realtors, insurance companies, the government, etc.). For example a butcher may share a report on the quality of the environment in their meat locker, and may be able to demonstrate the superior quality of their meats. Similarly, a homeowner could report the excellent air quality in their basement to prospective buyers, a commercial landlord may provide favorable reports with both prospective and current tenants, and/or a hotel could share environmental quality reports with guests. Alternatively, a restaurant may share the environmental quality of their kitchen with patrons or prospective patrons.

Using the electronic device, regulated industries (such as food production, pharmaceutical production, healthcare, energy, utilities, chemical production, paper mills, steel mills, etc.) may be monitored for environmental quality compliance and/or safety compliance by regulators, compliance monitors and/or an insurance company assessor. Alternatively, compliance data may be aggregated for subsequent use. In general, the sharing of the environmental quality rating may be voluntary (i.e., the user may opt in) unless required by law or contract.

Revenue and/or cost savings that result from method 1300 (FIG. 13) may be shared, directly or indirectly, with the user. For example, the user may receive an insurance discount or a tax credit based on the environmental quality rating. Alternatively or additionally, a provider of the environmental monitoring device may provide a financial incentive to the user to encourage the user to share the sensor data. In addition, an individual or an organization may receive special certifications from the government, an insurance company and/or another overseeing compliance group. The information provided by the electronic device may also enable insurance companies and regulators to set environmental quality levels using data-driven techniques.

Figure 15:
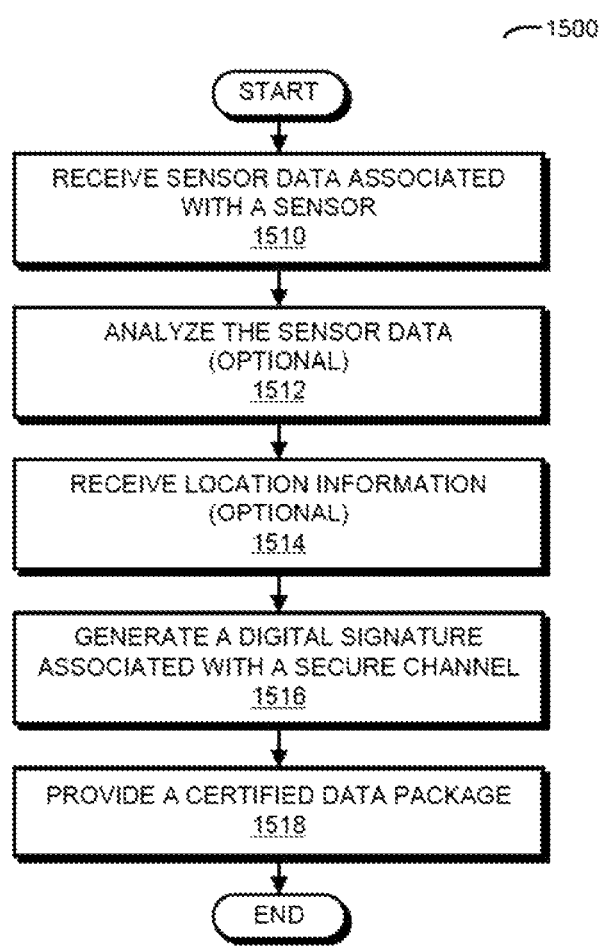
FIG. 15 is a flow diagram illustrating a method for providing a certified data package in accordance with an embodiment of the present disclosure.

FIG. 15 presents a flow diagram illustrating a method 1500 for providing a certified data package, which may be performed by a secure channel in a processor in the environmental monitoring device. For example, the processor may execute a program module that includes instructions for operations in method 1500. During operation, the processor may receive (or access) sensor data from a sensor (operation 1510) in the environmental monitoring device, where the sensor data represents an environmental condition in an external environment that includes the environmental monitoring device.

Then, the processor may optionally analyze the sensor data (operation 1512). As described previously with reference to FIGS. 13 and 14, the external environment may be associated with a physical object, and analyzing the sensor data may involve calculating a risk metric for the external environment and/or a financial value associated with the physical object that is based on the determined risk metric. This financial value may include: a commercial value of the physical object; and/or an insurance premium for the physical object.

Moreover, the processor may optionally receive location information (operation 1514) that specifies a location were the sensor data was acquired or measured. For example, the location information may be measured using a sensor device in the environmental monitoring device (such as a location monitor) and/or the location information may be received from another electronic device that is proximate to the environmental monitoring device (such as an individual's cellular telephone). Thus, the location may be determined via GPS and/or a cellular-telephone network (such as triangulation or trilateration).

Next, the processor may generate a digital signature associated with the secure channel (operation 1516), where the secure channel processes information and communicates the processed information using an encryption key associated with the secure channel. For example, the digital signature may be generated using an encryption key, such as an encryption key associated with the user of the environmental monitoring device and/or the secure channel. Alternatively or additionally, the digital signature may be generated using a secure hash of a time stamp (or a random number) and an identifier of the environmental monitoring device.

Furthermore, the processor may provide, to the archive device, the certified data package (operation 1518) for archiving in a historical record for the external environment, where the certified data package includes the sensor data, the optional analyzed sensor data, the digital signature, the time stamp and optional location information (which specifies a location where the sensor data were acquired).

Figure 16:
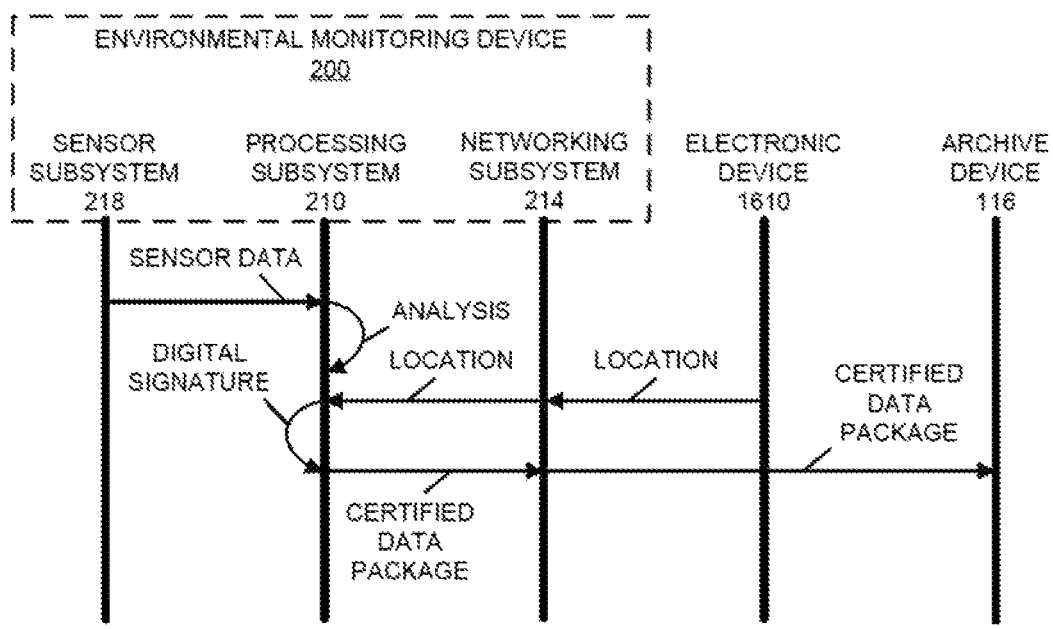
FIG. 16 is a drawing illustrating communication between an environmental monitoring device and an archive device during the method of FIG. 15 in accordance with an embodiment of the present disclosure.

FIG. 16 presents a drawing illustrating communication between an environmental monitoring device and an archive device during method 1500 (FIG. 15). In particular, sensor subsystem 218 may provide the sensor data to processing subsystem 210. Then, processing subsystem 210 may optionally analyze the sensor data. Moreover, networking subsystem 214 may optionally receive the location information, which is provided to processing subsystem 210 by another electronic device 1610 (such as GPS system or a cellular telephone or an individual proximate to environmental monitoring device 200) via networking subsystem 214. Next, processing subsystem 210 may determine the digital signature. Furthermore, processing subsystem 210 may provide the certified data package to networking subsystem 214, which communicates the certified data package to archive device 116.

In an exemplary embodiment of method 1500 (FIG. 15), two or more data points in a time series can be used as part of a historical record or log for the environment (such as a certified environmental report for a house or building that provides a history of maintenance and environmental conditions or quality of the house or building to interested parties, such as prospective buyers). If the sensor data includes acceleration and/or location information, the environmental quality report for a building or property can be invalidated based on detected movement of an environmental monitoring device. This historical record may be used to determine a risk metric and/or a financial value for the environment and/or the physical object (as described previously with reference to FIGS. 13 and 14). In another exemplary embodiment, a homeowner with a poor environmental record has contractors repair a problem with their environment, and the repair or maintenance service-record information may be noted securely in the historical record for the environment. Furthermore, subsequent improvements in the environmental quality can be noted along with the maintenance service records. This capability may allow a homeowner (in this example) to improve the quality of their environment in order to: lower their insurance premiums, increase the resale value, generate a return on investment/improvement of the property, and/or qualitatively or quantitatively improve their living environment. Note that this capability may be applied to commercial, hospitality, dining, storage, shipping and many other industries and/or environments.

Figure 17:
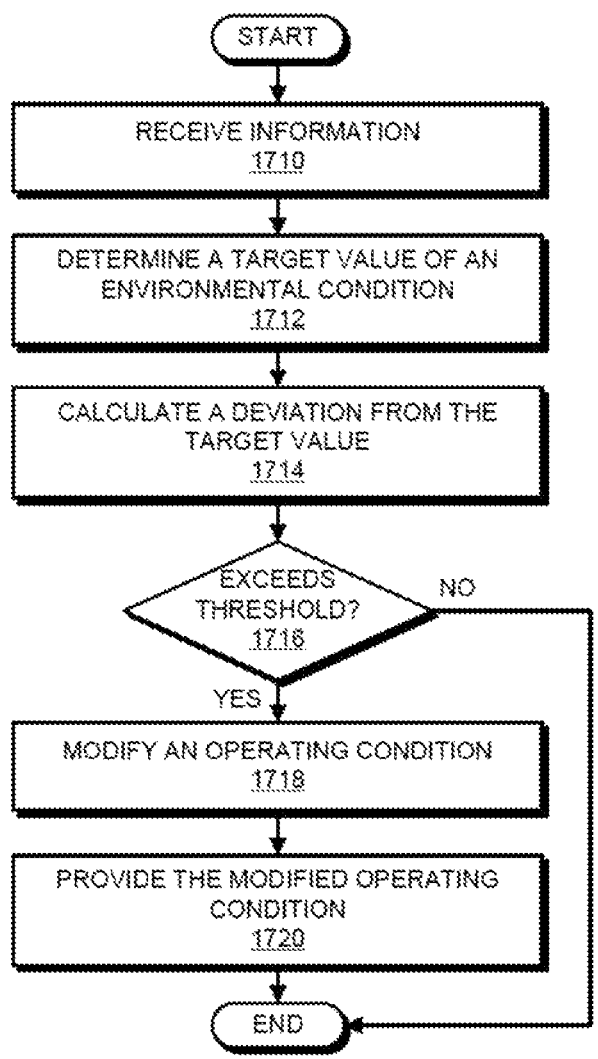
FIG. 17 is a flow diagram illustrating a method for modifying an operating condition in accordance with an embodiment of the present disclosure.

FIG. 17 presents a flow diagram illustrating a method 1700 for modifying an operating condition, which may be performed by a processor in an electronic device, such as the environmental monitoring device or another electronic device. For example, the processor may execute a program module that includes instructions for operations in method 1700. During operation, the processor may receive (or access) information (operation 1710), such as that specifying a medical condition of an individual. This information may be received from another electronic device, such as one that maintains health records of the individual and/or from an electronic device associated with the individual (such as the individual's cellular telephone). In addition, the information may include a forecast for an environmental condition (such as a weather or allergen forecast), which may be received from one or more other electronic devices (such as a computer or server) that are, in general, different from the electronic device that provides the information specifying the medical condition.

Note that the medical condition may include: an allergy, a chemical sensitivity, an illness, and/or a chronic disease that is affected by the environmental condition. More generally, the medical condition can include a user health preference. This health preference may be tangentially related to health or may provide some sort of placebo effect, e.g., turning up the thermostat when the individual is getting a cold. While this operating condition may or may not have an impact on the individual's health, it may have a psychological impact in helping the individual deal with the cold.

Then, the processor may determine a target value of an environmental condition (operation 1712) in an external environment of the electronic device based on the information specifying the medical condition. For example, medical knowledge may be accessed to determine health constraints or symptoms associated with the medical condition that may be alleviated or mitigated based on the target value. In addition, the target value may also be based on the forecast and % or a time (such as the time of day or the time of year, e.g., a season).

Moreover, the processor may calculate a deviation from the target value (operation 1714) based on sensor data and the target value, where the sensor data is provided by a sensor in the electronic device, and the sensor data represents the environmental condition. Note that the deviation may be an absolute difference or a relative value (such as a percentage).

Next, the electronic device may modify the operating condition (operation 1718) of a regulator device in the external environment if the deviation exceeds a threshold (operation 1716), wherein the regulator device regulates the environmental condition. For example, if a magnitude of the deviation exceeds the threshold (such as 5, 10 or 25%), the operating condition may be modified. More generally, the operating condition may be modified based on an absolute or a relative (such as a percentage) deviation. Otherwise, the operating condition may be unchanged (operation 1716).

Furthermore, the processor may provide the modified operating condition (operation 1720). For example, the modified operating condition may be provided to a user of one of environmental monitoring devices 110 (FIG. 1) and/or may be communicated to the regulator device (such as one of electronic devices 114 in FIG. 1).

In some embodiments, modifying the operating condition helps the individual manage a handicap. For example, it may make the environment more accessible to individuals with handicaps. Additionally, note that the information specifying the medical condition may be encrypted and/or de-identified in order to protect the identity of the individual. In these embodiments, the processor may receive an encryption key and may decrypt the information, and/or the processor may receive information specifying the identity of the individual. This latter information may be received separately from the information specifying the medical condition and/or from a different source than the other electronic device that provided the information specifying the medical condition.

Figure 18:
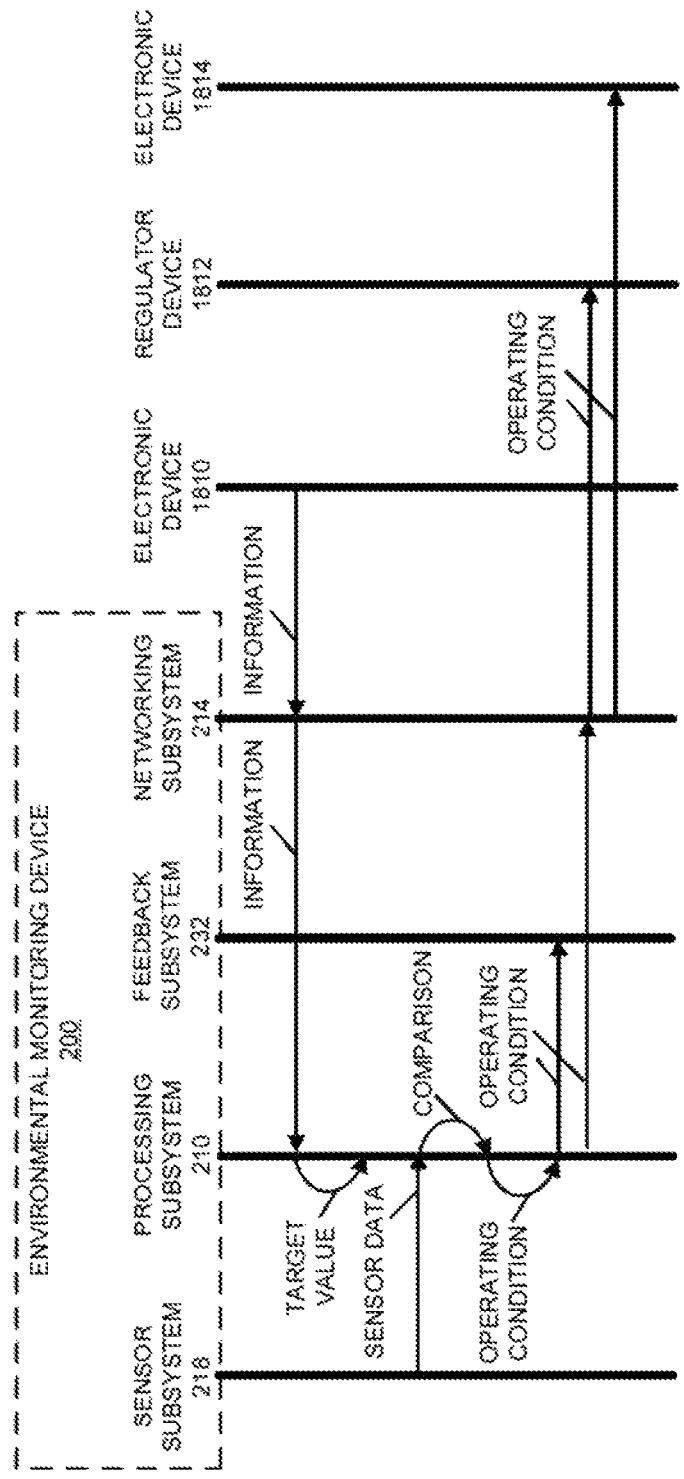
FIG. 18 is a drawing illustrating communication between an electronic device, a regulator device and/or another electronic device during the method of FIG. 17 in accordance with an embodiment of the present disclosure.

FIG. 18 presents a drawing illustrating communication between an electronic device, a regulator device and/or another electronic device during method 1700 (FIG. 17). In the following discussion, environmental monitoring device 200 is used as an illustrative example. In particular, electronic device 1810 (such as a medical record computer) may provide the information specifying the medical condition to networking subsystem 214, which is provided to processing subsystem 210. Then, processing subsystem 210 may determine the target value. Moreover, sensor subsystem 218 may provide the sensor data to processing subsystem 210. Next, processing subsystem 210 may compare the sensor data and the target value. If the deviation from the target value exceeds the threshold, processing subsystem 210 may modify the operating condition. This modified operating condition may be provided to networking subsystem 214 for communication to regulator device 1812 or another electronic device 1814 of the user (such as the user's cellular telephone, tablet computer or computer), and/or may be provided to the user via feedback subsystem 232.

In an exemplary embodiment of method 1700 (FIG. 17), the individual may have an allergy to pollen. The electronic device may determine a target concentration of the allergen (or a setting of an air filter). Moreover, the electronic device may monitor the environmental condition (such as the concentration of the allergen). If the environmental condition exceeds the target concentration, the electronic device may: increase air flow through an air filter (or may instruct an individual to increase the air flow if the air filter is a legacy electronic device). Depending on the time of year (pollen counts may be higher at certain times of the year) and/or an allergen forecast, the electronic device may modify the target concentration and/or may take other remedial action (such as closing the windows to a home or instructing the individual to close the windows).

Figure 19:
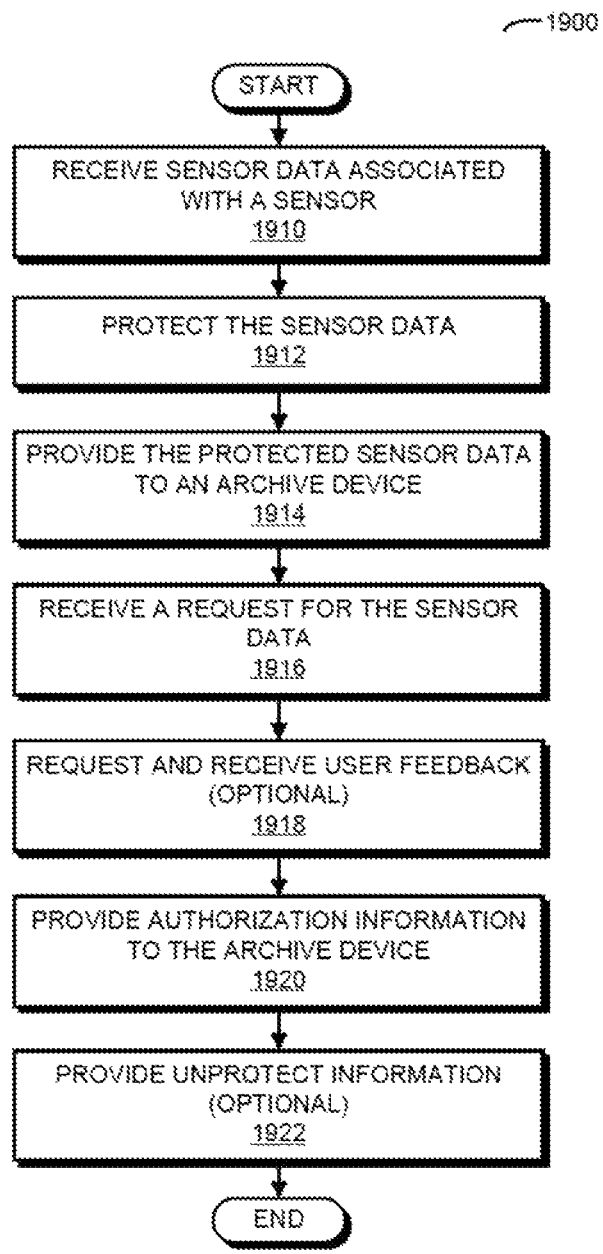
FIG. 19 is a flow diagram illustrating a method for authorizing access to sensor data in accordance with an embodiment of the present disclosure.

FIG. 19 presents a flow diagram illustrating a method 1900 for authorizing access to sensor data, which may be performed by a processor in the environmental monitoring device. For example, the processor may execute a program module that includes instructions for operations in method 1900. During operation, the processor may receive (or access) the sensor data from a sensor (operation 1910) in the environmental monitoring device, where the sensor data represents an environmental condition in an external environment that includes the environmental monitoring device.

Then, the processor may protect the sensor data (operation 1912). For example, the sensor data may be protected by hashing (using a secure hash function) the sensor data, a random number generated by the environmental monitoring device and an identifier of the environmental monitoring device. In some embodiments, the environmental monitoring device may store a set of secure hash functions that includes the secure hash function, and the secure hash function currently being used may be specified by a protection preference. In these embodiments, the protection preference may be received from the archive device. Alternatively, the same secure hash function may be used and the identifier of the environmental monitoring device may be dynamically updated, e.g., by the archive device.

Moreover, the processor may provide the protected sensor data to an archive device (operation 1914).

Next, the processor may receive a request for the sensor data (operation 1916) from another electronic device.

Furthermore, the processor may provide authorization information to the archive device to release the sensor data to the other electronic device (operation 1920). This authorization information may be provided based on a predefined authorization preference of a user associated with the environmental monitoring device (e.g., the recipient may have been previously specified and approved by the user). Alternatively, in some embodiments, the processor optionally requests and optionally receives user feedback about the request (operation 1918). In these embodiments, the authorization information is provided if the user feedback includes approval of the request. Note that the request may include an address of a recipient of the requested sensor data (such as a media access control address), and this address may be provided to the archive device in or along with the authorization information.

Additionally, the processor may optionally provide unprotect information (operation 1922), where the unprotect information indicate how to unprotect the protected sensor data. For example, the unprotect information may be provided to the archive device and/or to a recipient of the requested sensor data (who provided the request).

Figure 20:
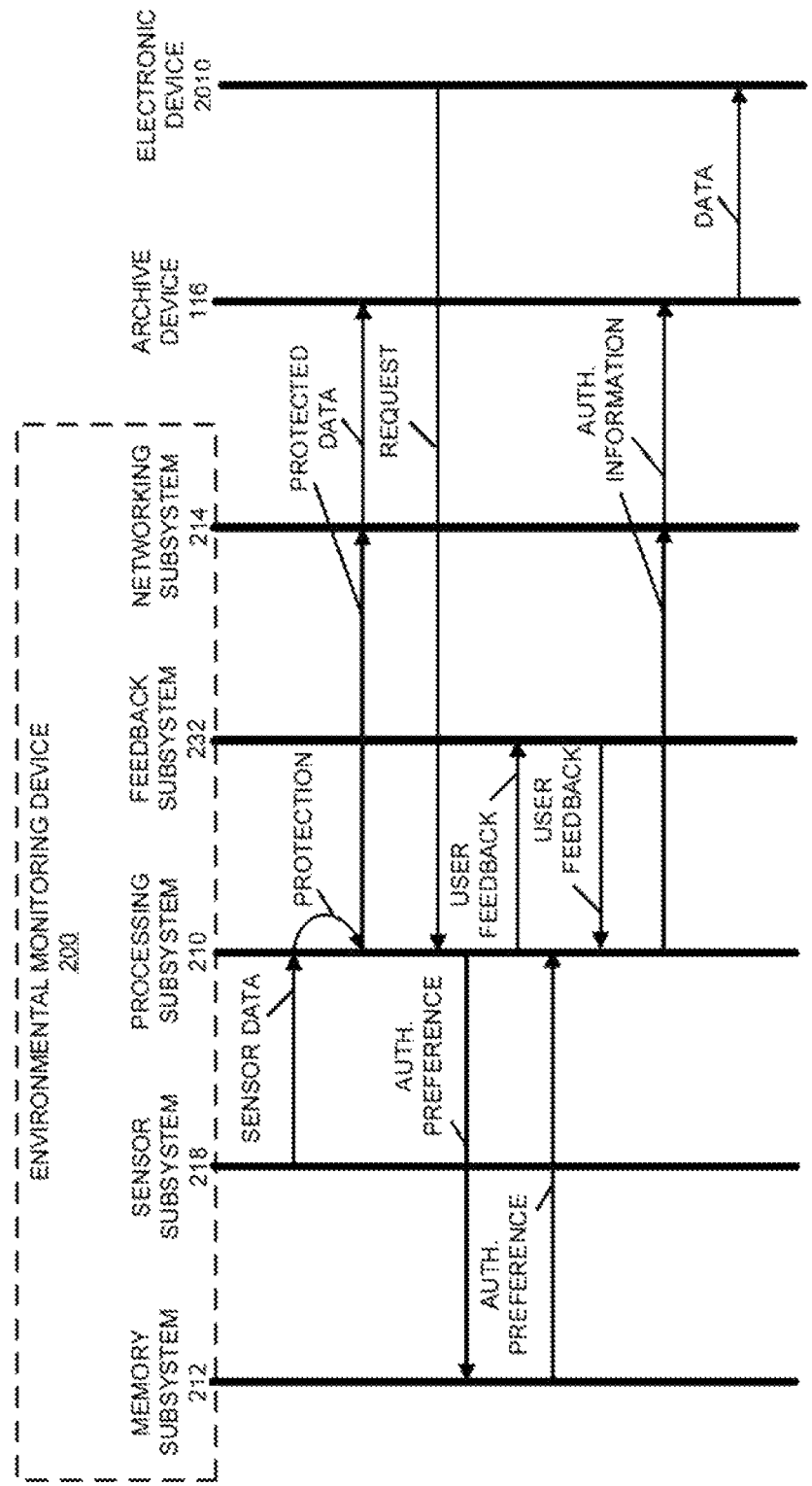
FIG. 20 is a drawing illustrating communication between an environmental monitoring device, an archive device and another electronic device during the method of FIG. 19 in accordance with an embodiment of the present disclosure.

FIG. 20 presents a drawing illustrating communication between an environmental monitoring device, an archive device and another electronic device during method 1900 (FIG. 19). In particular, sensor subsystem 218 may provide the sensor data to processing subsystem 210. Then, processing subsystem 210 may protect the sensor data. Moreover, processing subsystem 210 may provide the protected sensor data to networking subsystem 214, which communicates the certified data package to archive device 116. Next, networking subsystem 214 may receive the request for stored data from an electronic device 2010 (which is associated with the requestor), which is provided to processing subsystem 210. Processing subsystem 210 may either access the predefined authorization preference stored in memory subsystem 212 or may request the user feedback via feedback subsystem 232. Based on the predefined authorization preference or the user feedback received via optional user-interface subsystem 216 (for visual simplicity, the user feedback is provided to processing subsystem 210 by feedback subsystem 232 in FIG. 20), processing subsystem 210 may selectively provide the authorization information to networking subsystem 214 for communication to archive device 116. Furthermore, archive device may provide the requested data (which may be protected or unprotected) to electronic device 2010 based on the authorization information.

Method 1900 (FIG. 19) may provide the advantages of remote secure storage while allowing selective access to stored information by designated or approved recipients. In these ways, the user of the environmental monitoring device may maintain control over how their data is used and when it is released to third parties.

Figure 21:
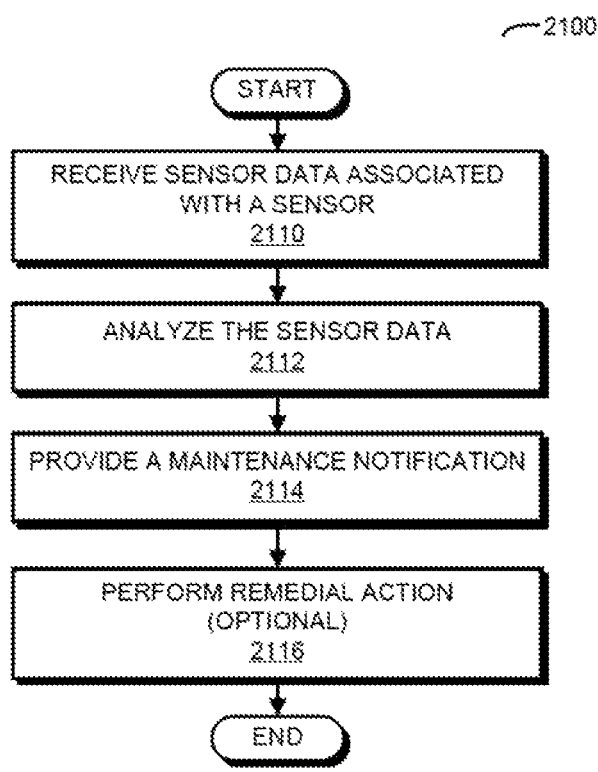
FIG. 21 is a flow diagram illustrating a method for providing a maintenance notification in accordance with an embodiment of the present disclosure.

FIG. 21 presents a flow diagram illustrating a method 2100 for providing a maintenance notification, which may be performed by a processor in the environmental monitoring device. For example, the processor may execute a program module that includes instructions for operations in method 2100. During operation, the processor may receive (or access) sensor data (operation 2110) associated with a sensor in the environmental monitoring device, where the sensor data is for an external environment that includes the environmental monitoring device, and the sensor data represents an environmental condition that is associated with operation of an electronic device in the external environment. Note that the sensor may provide the sensor data without or excluding communication and/or electrical coupling between the environmental monitoring device and the legacy electronic device.

Then, the processor may analyze the sensor data (operation 2112). For example, analyzing the sensor data may involve comparing the sensor data to a threshold value, such as a maximum or minimum value of the environmental condition.

Moreover, the processor may provide the maintenance notification (operation 2114) related to the operation of the electronic device based on the analyzed sensor data. For example, the maintenance notification may include an instruction to: take out the garbage (which may be determined based on the presence of a chemical or a certain concentration of the chemical), open a window, change a filter, perform maintenance on the electronic device, replace a power source in the electronic device (such as a battery), calibrate a sensor, and/or replace a sensor (or a component) in the electronic device. Note that the maintenance notification may be provided to a third party (such as a maid or a janitor) that performs maintenance on the electronic device. Thus, the maintenance notification may be provided to an electronic device associated with the third party, such as a cellular telephone.

The third party may be other than a user associated with the environmental monitoring device and a provider of the environmental monitoring device. In this way, method 2100 may allow automation of maintenance tasks. Furthermore, regular maintenance notifications that are serviced may be securely recorded and maintained as part of the service or historical records for the environment, which can have a positive effect on the value of: a building, a portion of a building, a shipping container, a shipping service, etc.

Additionally, the processor may perform a remedial action related to the maintenance notification (operation 21116). For example, a replacement component for the electronic device may be ordered based on the maintenance notification. This remedial action may be part of a subscription service for spare parts for the electronic device. If the component identifier is unknown, an image of the component may be used to identify it (e.g., using an image recognition technique). Alternatively or additionally, the processor may alert maintenance staff or a recycling organization that the previous component needs to be recycled. In some embodiments, the remedial action includes providing a command to an access-control device for the external environment based on the maintenance notification. Thus, the command may instruct a motor to open windows on one side of a house based on the prevailing wind conditions when the air conditioning is not working properly. In addition, the processor may provide information specifying the maintenance notification and/or any subsequent remedial action (such as a service or repair performed on the electronic device) performed in response to the maintenance notification to an archive device that maintains a historical record for the environment. Thus, remedial actions such as ordering new air filters, getting a contractor to fix a heating and air-conditioning system, installing ventilation to remove radon from a basement of a house, etc. may be stored in historical records.

Figure 22:
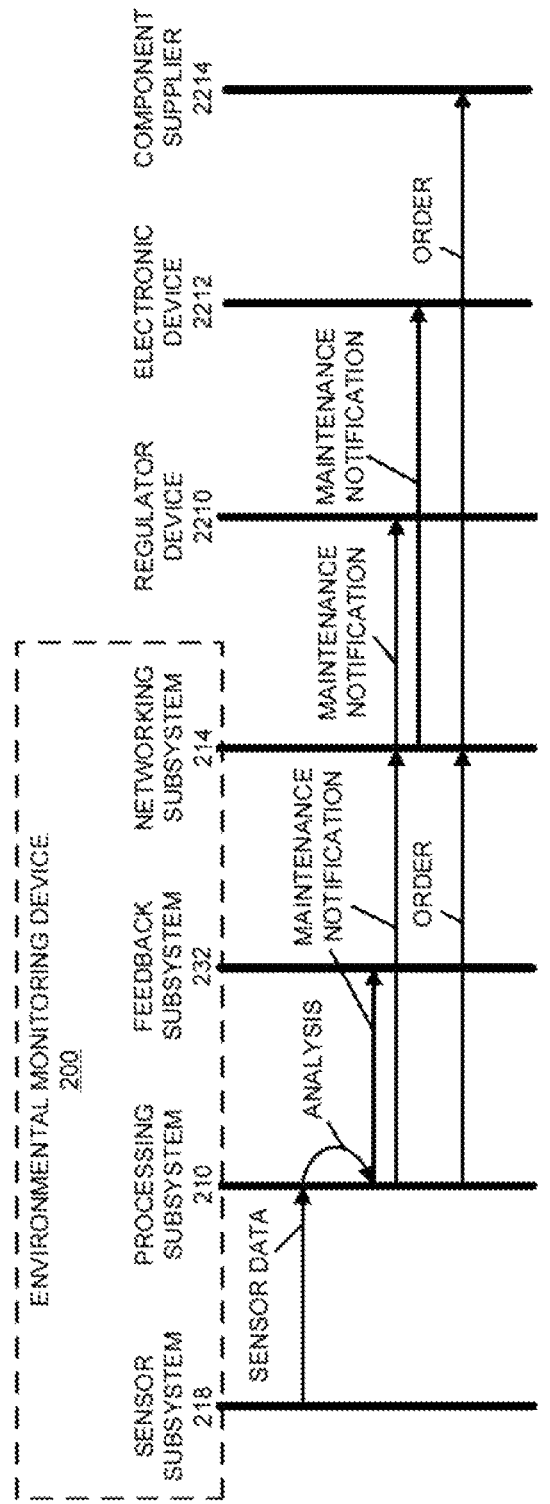
FIG. 22 is a drawing illustrating communication between an environmental monitoring device and another electronic device during the method of FIG. 21 in accordance with an embodiment of the present disclosure.

FIG. 22 presents a drawing illustrating communication between an environmental monitoring device and another electronic device during method 2100 (FIG. 21). In particular, sensor subsystem 218 may provide the sensor data to processing subsystem 210. Then, processing subsystem 210 may analyze the sensor data. Moreover, processing subsystem 210 may provide the maintenance notification based on the analyzed sensor data. For example, the maintenance notification may be provided to networking subsystem 214 for communication to one of electronic devices 114 in FIG. 1 (such as regulator device 2210) or another electronic device 2212 of the third party (such as the third party's cellular telephone, tablet computer or computer), and/or may be provided to the user via feedback subsystem 232. Furthermore, processing subsystem 110 may perform the remedial action, such as by providing an order for the replacement component to networking subsystem 214 for communication to component supplier 2214 (or a computer associated with or operated on behalf of component supplier 2214). While not shown in FIG. 22, in some embodiments processing subsystem 210 provides information specifying the maintenance notification and/or any subsequent remedial action (such as a repair or service performed on regulator device 2210) performed in response to the maintenance notification to networking subsystem 214 for communication to an archive device (such as archive device 116 in FIG. 1) that maintains a historical record for the environment.

In an exemplary embodiment of method 2100 (FIG. 19), the sensor data may monitor performance of an air filter. If the sensor data indicate that the concentration of dust or the mean dust-particle size exceeds a target value corresponding to a safe or health environment, the maintenance notification may indicate a need to change the filter in the air filter. The environmental monitoring device may provide the maintenance notification to a maintenance worker. In addition, the environmental monitoring device may order a replacement filter from a supplier. This capability of automating basic maintenance on the air filter (and, more generally, for an electronic device or a regulator device that helps maintain the environmental condition) may be offered as a subscription service. (Similarly, one or more other functions of the environmental monitoring device and/or the archive device may be offered for a one-time fee or as a subscription service to the user of the environmental monitoring device and/or a third party.)

In some embodiments of one or more of the preceding methods, there may be additional or fewer operations. Furthermore, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An environmental monitoring device, comprising:
    a sensor configured to provide sensor data that represents an environmental condition in an external environment that includes the environmental monitoring device;
    an antenna;
    an interface circuit, coupled to the antenna, configured to communicate with an archive device and another electronic device;
    a processor; and
    a memory, coupled to the processor, which stores a program module configured to be executed by the processor, the program module including:
        instructions for receiving the sensor data from the sensor;
        instructions for protecting the sensor data;
        instructions for providing the protected sensor data to the archive device;
        instructions for receiving a request for the sensor data from the other electronic device;
        instructions for requesting user feedback about the request;
        instructions for receiving the user feedback, wherein the authorization information is provided if the user feedback includes approval of the request; and
        instructions for providing authorization information to the archive device to release the sensor data to the other electronic device.

2. The environmental monitoring device of claim 1, wherein the authorization information is based on a predefined authorization preference of a user associated with the environmental monitoring device.

3. The environmental monitoring device of claim 1, wherein protecting the sensor data involves hashing, using a secure hash function, the sensor data, a random number generated by the environmental monitoring device and an identifier of the environmental monitoring device.

4. The environmental monitoring device of claim 3, wherein the memory stores a set of secure hash functions that includes the secure hash function;
    wherein the secure hash function is specified by a protection preference; and
    wherein the program module further includes instructions for receiving the protection preference from the archive device.

5. The environmental monitoring device of claim 1, wherein the program module further includes instructions for communicating, to the archive device, information specifying how to unprotect the sensor data.

6. The environmental monitoring device of claim 1, wherein the program module further includes instructions for communicating, to the other electronic device, information specifying how to unprotect the sensor data.

7. The environmental monitoring device of claim 1, wherein the request includes an address of the other electronic device; and
    wherein the authorization information includes the address.

8. A computer-program product for use in conjunction with a processor in an environmental monitoring device, the computer-program product comprising a non-transitory computer-readable storage medium and a computer-program mechanism embedded therein to authorize access to sensor data, the computer-program mechanism including:
    instructions for receiving the sensor data from a sensor in the environmental monitoring device, wherein the sensor data represents an environmental condition in an external environment that includes the environmental monitoring device;
    instructions for protecting the sensor data;
    instructions for providing the protected sensor data to an archive device;
    instructions for receiving; a request for the sensor data from another electronic device;
    instructions for requesting user feedback about the request;
    instructions for receiving the user feedback, wherein the authorization information is provided if the user feedback includes approval of the request; and
    instructions for providing authorization information to the archive device to release the sensor data to the other electronic device.

9. The computer-program product of claim 8, wherein the authorization information is based on a predefined authorization preference of a user associated with the environmental monitoring device.

10. The computer-program product of claim 8, wherein protecting the sensor data involves hashing, using a secure hash function, the sensor data, a random number generated by the environmental monitoring device and an identifier of the environmental monitoring device.

11. The computer-program product of claim 10, wherein the secure hash function is one of a set of secure hash functions stored in the environmental monitoring device;
    wherein the secure hash function is specified by a protection preference; and wherein the computer-program mechanism further includes instructions for receiving the protection preference from the archive device.

12. The computer-program product of claim 8, wherein the computer-program mechanism further includes instructions for communicating, to the archive device, information specifying how to unprotect the sensor data.

13. The computer-program product of claim 8, wherein the computer-program mechanism further includes instructions for communicating, to the other electronic device, information specifying how to unprotect the sensor data.

14. A processor-implemented method for authorizing access to sensor data, wherein the method comprises:
    receiving the sensor data from a sensor in the environmental monitoring device, wherein the sensor data represents an environmental condition in an external environment that includes the environmental monitoring device;
    using the processor in the environmental monitoring device, protecting the sensor data;
    providing the protected sensor data to an archive device;
    receiving a request for the sensor data from another electronic device;
    requesting user feedback about the request;
    receiving the user feedback, wherein the authorization information is provided if the user feedback includes approval of the request; and
    providing authorization information to the archive device to release the sensor data to the other electronic device.

15. The method of claim 14, wherein protecting the sensor data involves hashing, using a secure hash function, the sensor data, a random number generated by the environmental monitoring device and an identifier of the environmental monitoring device.

16. The method of claim 15, wherein the secure hash function is one of a set of secure hash functions stored in the environmental monitoring device;
    wherein the secure hash function is specified by a protection preference; and
    wherein the method further comprises receiving the protection preference from the archive device.

17. The method of claim 14, wherein the method further comprises communicating information specifying how to unprotect the sensor data to the archive device.

18. The method of claim 14, wherein the method further comprises communicating information specifying how to unprotect the sensor data to the other electronic device.

19. The method of claim 14, wherein the authorization information is based on a predefined authorization preference of a user associated with the environmental monitoring device.

20. The method of claim 14, wherein the request includes an address of the other electronic device; and
    wherein the authorization information includes the address.

* * * * *